United States Patent [19]
Miyata

[11] Patent Number: 5,540,627
[45] Date of Patent: Jul. 30, 1996

[54] AUTO-TENSIONER

[75] Inventor: Hirofumi Miyata, Kobe, Japan

[73] Assignee: Bando Chemical Industries, Ltd., Kobe, Japan

[21] Appl. No.: 348,193

[22] Filed: Nov. 28, 1994

[30] Foreign Application Priority Data

Jun. 14, 1994 [JP] Japan .................................. 6-132119
Jun. 14, 1994 [JP] Japan .................................. 6-132121
Jun. 14, 1994 [JP] Japan .................................. 6-132134
Jun. 14, 1994 [JP] Japan .................................. 6-132146

[51] Int. Cl.$^6$ .................................................. F16H 7/08
[52] U.S. Cl. ........................................ 474/112; 474/135
[58] Field of Search .......................... 474/101, 109–117, 474/133–138

[56] References Cited

U.S. PATENT DOCUMENTS

| 4,473,362 | 9/1984 | Thomey et al. | |
| 4,808,148 | 2/1989 | Holtz | 474/112 |
| 4,934,987 | 6/1990 | Kadota et al. | 474/112 |
| 5,266,067 | 11/1993 | Gapco | 474/112 |

FOREIGN PATENT DOCUMENTS 4-66448   6/1992   Japan .

*Primary Examiner*—Michael Powell Buiz
*Attorney, Agent, or Firm*—Sixbey, Friedman, Leedom & Ferguson; Gerald J. Ferguson, Jr.; Thomas W. Cole

[57] ABSTRACT

An auto-tensioner for applying tension to a transmission belt by a tension pulley and for damping reaction force acting from the belt. The tension pulley is rotatably supported to a lever member rotatably supported to a fixed pulley. A movable pulley is provided on the lever member at a position offset with respect to an axis of the tension pulley. An endless belt is wound between a circular friction surface of the fixed pulley and a circular friction surface of the movable pulley. An initial tension applying spring forces to move the movable pulley outward, thereby applying initial tension to the belt. When the movable pulley is moved by reaction force acting on the tension pulley from the transmission belt, damping force according to the reaction force is generated by grip generated between the belt and respective pulleys owing to change of tension between both spans of the belt.

9 Claims, 26 Drawing Sheets

AUTO-TENSIONER

BACKGROUND OF THE INVENTION

This invention relates to an auto-tensioner for applying tension to a timing belt, a belt for driving an auxiliary of a vehicle engine or the like while damping belt reaction force as external force, in particular, relates to measures for simplifying a damping mechanism.

Conventionally, for an auto-tensioner of such kind, there has been commonly used an auto-tensioner using a hydraulic damping mechanism as shown in the Japanese Utility Model Laying Open Gazette No.4-66448. This auto-tensioner essentially consists of: a hydraulic damping mechanism having a piston rod movable forward and backward; and a rotating member which has a tension pulley for pressing a belt and changes the operating direction of the piston rod by, for example, 90°.

The damping mechanism has: a cylinder body which is filled with operating oil; a piston which is inserted reciprocatably into the cylinder body and sections the inside of the cylinder body into first and second oil rooms; a piston rod passing through an end wall of the cylinder on a first oil room side and connected at an inner end thereof to the piston so as to move together with the piston; and a compression coil spring contractedly placed in the second oil room for forcing to press the piston on the first oil room side so as to extend the cylinder. A communication passage for establishing communication between the first and second oil rooms is provided in the piston and the cylinder. A check valve is provided in a part on the piston side of the communication passage.

The check valve operates to close the communication passage to restrict the movement of the piston, when the piston moves opposite to the direction that the compression coil spring forces to press by the external force in the direction of retraction of the cylinder so that the operating oil of the second oil room may flow into the first oil room. On the other hand, the check valve operates to open the communication passage to allow the movement of the piston, when the piston moves in the direction that the compression coil spring forces to press at the extension of the cylinder so that the operating oil of the first oil room may flow into the second oil room. Further, when the belt reaction force against the pressing of the tension pulley presses the piston opposite to the direction that the compression coil spring forces to press so that the external force in the direction of retraction of the cylinder is applied to a tip end of the piston rod, the check valve restricts the movement of the piston thereby damping the belt reaction force through the rotating member.

However, since the above hydraulic auto-tensioner generates the following problems, it has been desired to solve those problems.

(1) Because of the use of flow resistance of the operating oil, the above auto-tensioner requires high sealing performance thereby complicating the structure. This invites increase of the number of parts and much expense in time and effort for assembly work. Accordingly, it is difficult to reduce the cost.

(2) In the case of application of excessive belt reaction force, the pressure of the operating oil is increased in proportion to the reaction force, so that the damping mechanism may be damaged due to high pressure.

(3) Since damping characteristics are determined by passage resistance of communication passage, check valve and the like, specified damping characteristics are previously established in the damping mechanism. Accordingly, it is difficult to change and adjust the established damping characteristics. To change the damping characteristics, the whole damping mechanism must be exchanged.

(4) Viscosity characteristics of operating oil which have an effect on damping characteristics are readily affected by change of temperature. For example, flow resistance of operating oil is increased at a low temperature as compared with at an ordinary temperature, so that damping force excesses its set value.

(5) Since the damping mechanism operates in the direction of the length, in the case where the tension pulley is directly mounted at the tip end of the piston rod to press the belt, the base end of the damping mechanism protrudes sideward from the engine. Therefore, the damping mechanism must be placed along a running direction of the belt, thereby requiring another rotating member for changing the operating direction of the piston rod. This prevents compaction and weight reduction of the auto-tensioner.

(6) For the same reason as in the above point (5), two members of the damping mechanism and the member for changing the operating direction of the piston rod must be mounted on the engine. This invites much expense in time and effort for assembly work.

This invention has been made in view of the foregoing problems. It is a main object of this invention, by using pulley members and a friction member such as a belt wound therearound, to achieve easy assembly at a low parts count to reduce the cost, to provide a fail-safe function with respect to excessive external force, to achieve easy tuning for setting damping characteristics and reduction in temperature-dependent performance of damping characteristics, and to simplify assembly work to the engine while reducing in size.

SUMMARY OF THE INVENTION

To attain the above object, this invention uses the fact that grip between a pulley member and a friction member wound around the pulley member is changed when tension of the friction member wound around the pulley member is changed between both spans. That is, in this invention, by changing the grip according to external force to be damped, damping force according to the external force is obtained. Thus, the number of parts is reduced and assembly work is facilitated, thereby achieving cost reduction. Further, by coping with excessive external force by slip between the pulley member and the friction member and by adjusting a tension changing ratio of the spans, the setting of damping characteristics is readily tuned. Furthermore, because of using no operating oil, temperature-dependent performance is reduced and assembly work to the engine is simplified while reducing in size.

BRIEF DESCRIPTION OF THE DRAWINGS

Accompanying drawings show preferable embodiments of an auto-tensioner of this invention.

FIG. 1 is a front view showing an auto-tensioner; FIG. 2 is a back side view of the auto-tensioner; FIG. 3 is a cross section taken along the line III—III of FIG. 1; FIG. 4 is a diagram corresponding to FIG. 3 in a modification of a belt; FIG. 5 is a diagram corresponding to FIG. 1 in a first type modification; FIG. 6 is a diagram corresponding to FIG. 2 in the first type modification; FIG. 7 is a diagram corresponding to FIG. 3 in the first type modification; FIG. 8 is a perspective view of a movable pulley in a second type modification; FIG. 9 is a diagram corresponding to FIG. 1 in the second type modification; FIG. 10 is a diagram corresponding to FIG. 2 in the second type modification; FIG. 11 is a diagram corresponding to FIG. 3 in the second type modification; FIG. 12 is a diagram showing the gravity center of the movable pulley in the second type modification; and FIG. 13 is a diagram showing the gravity center in the movable pulleys of the other type for comparison.

FIG. 14 is a front view showing an auto-tensioner; FIG. 15 is a cross section taken along the line XV—XV of FIG. 14; FIG. 16 is a cross section taken along the line XVI—XVI of FIG. 14; FIG. 17 is an exploded perspective view of the auto-tensioner; FIG. 18 is a perspective view of a tension converting member; FIG. 19 is a diagram corresponding to FIG. 14 in a second type modification; FIG. 20 is a diagram corresponding to FIG. 15 in the second type modification; and FIG.21 is a diagram corresponding to FIG. 16 in the second type modification.

FIG. 22 is a front view of an auto-tensioner; FIG. 23 is a cross section taken along the line XXIII—XXIII of FIG. 22; and FIG. 24 is a back side view showing the auto-tensioner.

FIG. 25 is a front view showing an auto-tensioner; FIG. 26 is a cross section taken along the line XXVI—XXVI of FIG. 25; and FIG. 27 is a perspective view showing a pressing mechanism part.

DESCRIPTION OF THE PREFERRED EMBODIMENTS

First Embodiment

Description will be made next about an application of an auto-tensioner of this invention, that is, about the auto-tensioner composed so as to apply set tension to a V-belt for driving auxiliaries of a vehicle engine and to automatically change damping force with respect to a tension adjusting operation according to variation of the tension.

Figure 1:
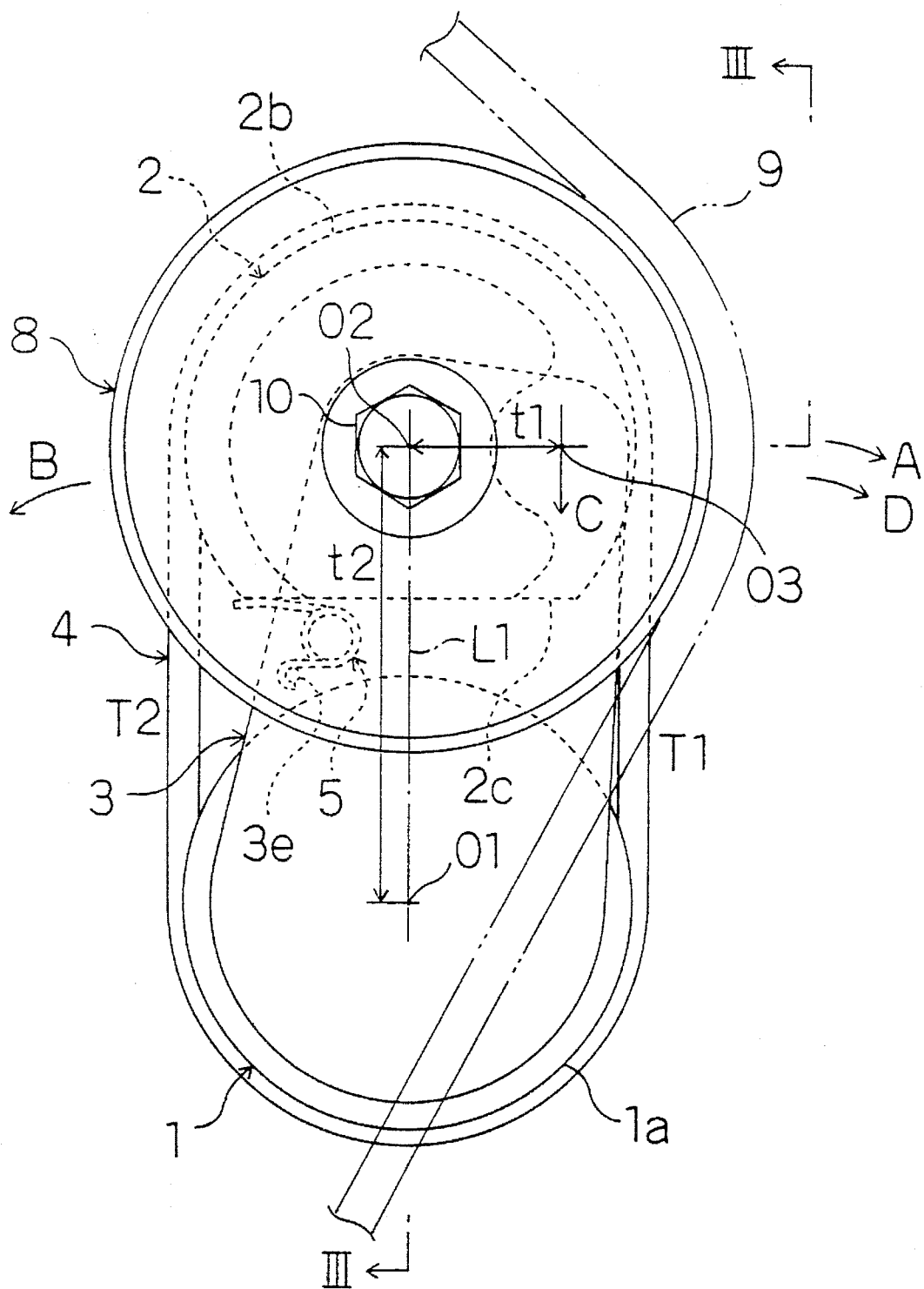
FIGS. 1 to 13 show a first embodiment.
Figure 2:
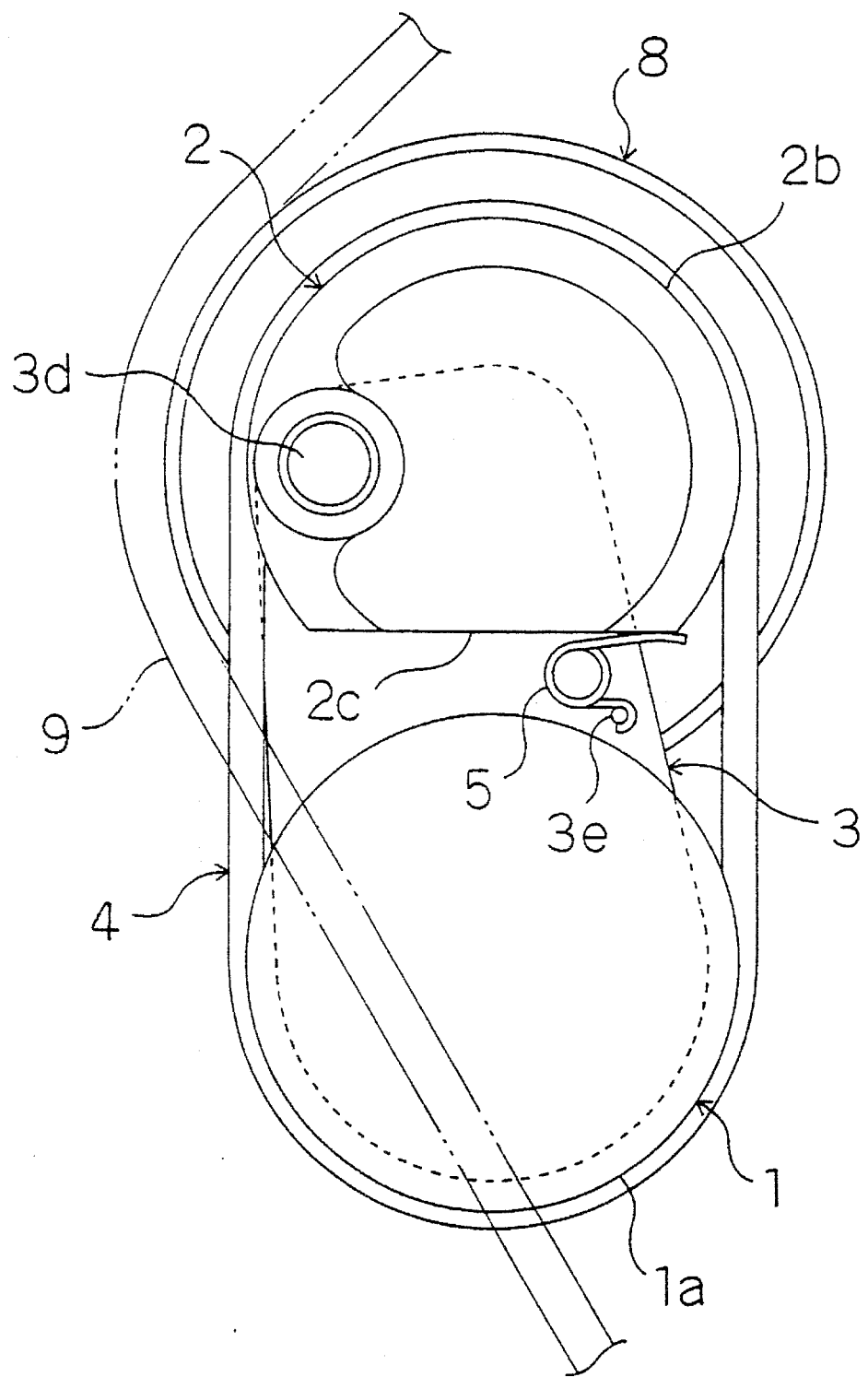
Figure 3:
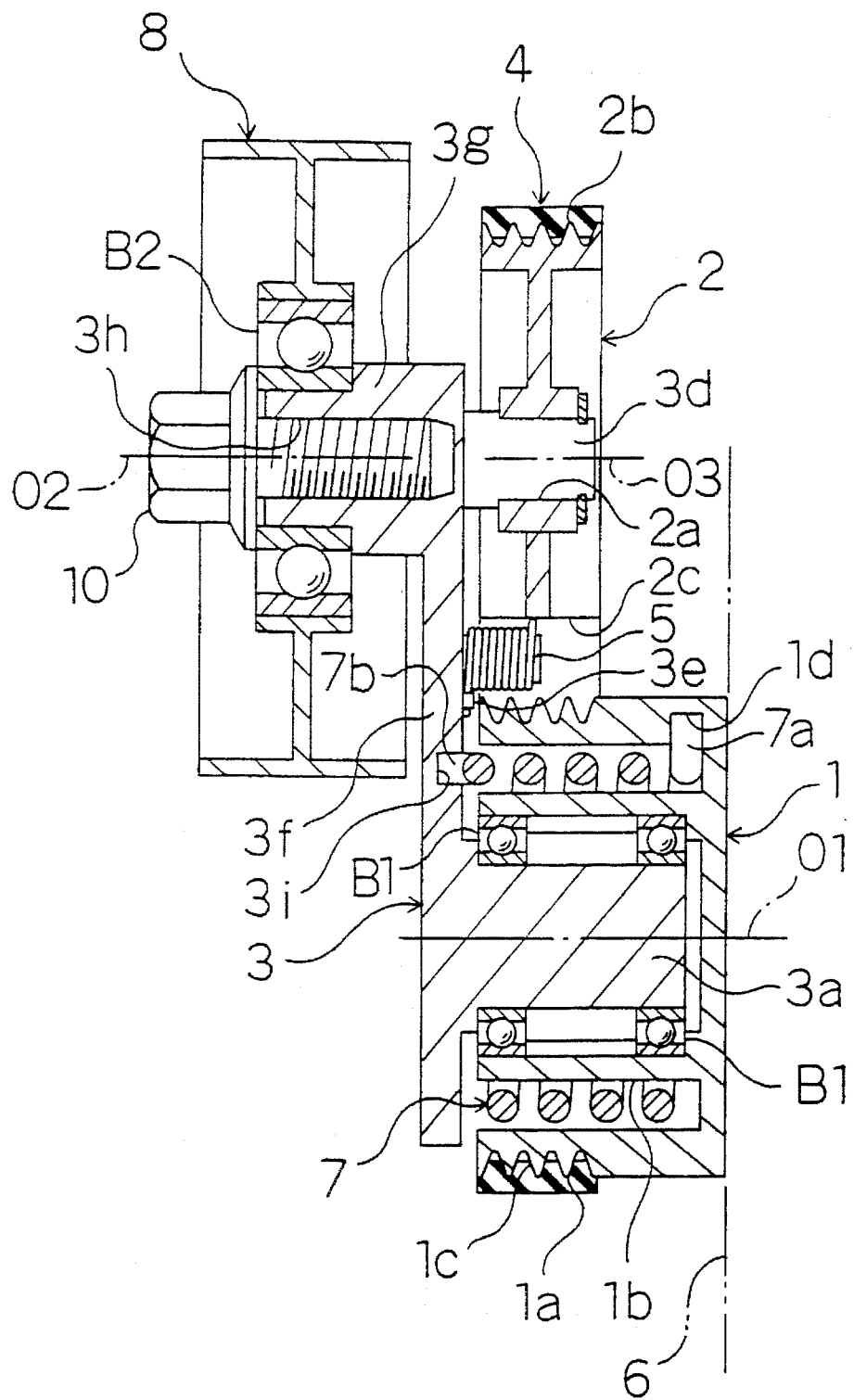

FIGS. 1 to 3 show the whole structure of an auto-tensioner according to this embodiment; FIG. 1 is a diagram showing a front side of the auto-tensioner (side on which the auto-tensioner is not opposed to an engine block 6); FIG. 2 is a diagram showing a rear side of the auto-tensioner (side on which the auto-tensioner is opposed to the engine block 6); and FIG. 3 is a cross section taken along the line III—III of FIG. 1, wherein the left side shows a front and the right side shows a rear.

As shown in the above figures, this auto-tensioner comprises: a fixed pulley 1 fixed to the engine block 6 of the vehicle engine and made of metal such as aluminum alloy; a metallic lever member 3 supported to the fixed pulley 1 rotatably around a central axis 01 thereof; a torsion coil spring 7 as a resilience member contractedly placed between the fixed pulley 1 and the lever member 3 to force to rotate the lever member 3 clockwise of FIG. 1 with respect to the fixed pulley 1; a metallic movable pulley 2 supported to the lever member 3 rotatably around a rotation axis 03 (offset rotation axis) thereof; a ribbed belt 4 wound between the fixed pulley 1 and the movable pulley 2; and a tension pulley 8 supported to the lever member 3 rotatably around a rotation axis 02 thereof for applying set tension to a V-belt 9 for driving an auxiliary of the engine. Detailed description is made below about the above members.

The fixed pulley 1 has a cup shape that a front side thereof (left side in FIG. 3) is opened, and has at the inside a cylindrical bearing part 1b extending on the front side along the central axis 01 from the center of a bottom wall thereof. On a friction surface 1a located at an outer peripheral edge of the fixed pulley 1, V-grooves 1c for engaging with ribs of the ribbed belt 4 are formed in a peripheral direction over a circumference of the fixed pulley 1. In the vicinity to the bottom on an inner peripheral surface of the fixed pulley 1, a spring rear-side end holding hole 1d is formed so as to be caved in outward in a radial direction of the fixed pulley 1.

The lever member 3 comprises: a lever main part 3f shaped like a flat plate; a columnar rotating shaft part 3a which extends from an end opposing the fixed pulley 1 on a rear side surface of the lever main part 3f (lower end in FIG. 3) toward the bearing part 1b of the fixed pulley 1 and which is supported to the bearing part 1b via bearings B1; a first shaft part 3d which serves as a rotating shaft of the movable pulley 2 and is protruded from the other end opposing the movable pulley 2 on the rear side surface of the lever main part 3f (upper end in FIG. 3); and a second shaft part 3g which serves as a rotating shaft of the tension pulley 8 and is protruded from a front side surface of the lever main part 3f. A bolt hole 3h is formed at the center of the second shaft part 3g. Further, on the rear side surface of the lever main part 3f of the lever member 3, a spring front-side end holding hole 3i is formed in opposition to the inside of the fixed pulley 1 so as to be caved in on the front side.

The torsion coil spring 7 is formed, if seen from the front side, in a left hand wind from a rear side end 7a toward a front side end 7b, and is contractedly placed in such a manner that the rear side end 7a located on the rear side is fitted into the spring rear-side end holding hole 1d of the fixed pulley 1 and the front side end 7b located on the front side is fitted into the spring front-side end holding hole 3i of the lever member 3, thereby forcing to rotate the lever member 3 in a set direction (clockwise in FIG. 1) with respect to the fixed pulley 1.

The tension pulley 8 is rotatably supported to the second shaft part 3g of the lever member 3 via a bearing B2, and is prevented from removing in such a manner that a bolt 10 is screwed in the second shaft part 3g. The V-belt 9 for driving an auxiliary of a vehicle engine is wound around the tension pulley 8 as shown in imaginary lines in FIGS. 1 and 2. The tension pulley 8 presses the V-belt 9 by receiving the above-mentioned force of the torsion coil spring 7, thereby applying set tension to the V-belt 9.

The movable pulley 2 is cut at a portion of an outer peripheral edge which is opposed to the fixed pulley 1, and has at an outer peripheral surface an arcuate friction surface 2b and a flat spring contact surface 2c. Further, the movable pulley 2 is rotatably supported to the first shaft part 3d of the lever member 3, and is disposed in a position where the movable pulley 2 avoids interference with the fixed pulley 1 and is apart from the fixed pulley 1 by a set distance. Furthermore, a feature of the movable pulley 2 is that the rotation axis 03 is offset right in a horizontal direction of FIG. 1 by a set dimension t1 with respect to the center 02 of the arc of the arcuate friction surface 2b. In detail, the center 02 of the arc of the friction surface 2b is set at a position opposite to a rotation axis of the tension pulley 8, that is, the center 02 of the second shaft part 3g, while the offset axis 03 of the movable pulley 2, that is, the center of an opening 2a to which the first shaft part 3d is supported is set at a position offset right in a horizontal direction of FIG. 1 by a dimension t1 with respect to the center 02 of the arc. Accordingly, when the movable pulley 2 rotates counterclockwise around the offset axis 03 of FIG. 1, a distance t2 between the center 02 of the movable pulley 2 and the center 01 of the fixed pulley 1 is decreased. On the contrary, when the movable pulley 2 rotates clockwise of FIG. 1, the distance t2 between the center 02 of the movable pulley 2 and the center 01 of the fixed pulley 1 is increased. As in the fixed pulley 1, on the friction surface 2b of the movable pulley 2, V-grooves 2b with which the ribs of the ribbed-belt 4 are engaged are formed in a peripheral direction over a circumference of the movable pulley 2.

The ribbed belt 4 is wound over both the friction surfaces 1a, 2b of the fixed and movable pulleys 1, 2. The contact part of the belt 4 with the fixed pulley 1 is located in a lower half of the friction surface 1a of the fixed pulley 1, while the contact part of the belt 4 with the movable pulley 2 is located in an upper half of the friction surface 2b of the movable pulley 2.

Between the lever member 3 and the movable pulley 2, an initial tension applying spring 5 is provided as a forcing member for applying set initial tension to the ribbed belt 4. In detail, between the fixed pulley 1 and the movable pulley 2 on the rear side surface of the lever member 3, the initial tension applying spring 5 composed of a torsion coil spring is contractedly placed in such a manner that an end thereof is hitched to a small-diameter pin 3e protruded at a position which is offset opposite to an offset direction of the offset axis 03 of the movable pulley 2 with respect to a straight line L1 connecting between the centers 01, 02 of the pulleys 1, 2, and that the other end contacts the spring contact surface 2c of the movable pulley 2. Thus, the force of the initial tension applying spring 5 acts as a force which rotates the movable pulley 2 clockwise in FIG. 1 around the offset axis 03. In other words, the initial tension applying spring 5 applies set tension to the ribbed belt 4 by its force which forces to rotate in a direction that the distance t2 between the centers 01, 02 of the fixed and movable pulleys 1, 2 is gradually increased, so that the set tension is obtained as initial tension in a state that no external force acts on the ribbed belt 4.

Next, description is made about an operation of the auto-tensioner having the above structure. Here, in relation to the belt 4 wound between the pulleys 1, 2, it is assumed that tension of a right span of FIG. 1 is T1 and tension of a left span of FIG. 1 is T2.

Since the lever member 3 is given force A acting clockwise in FIG. 1 by the force of the torsion coil spring 7, the tension pulley 8 over which the V-belt 9 is wound rotates in accordance with the running of the V-belt 9 while applying the pressing force to the V-belt 9. Then, from that state, auxiliaries such as air conditioner (no-shown) operate so that a load is put on pulleys for driving the auxiliaries over which the V-belt 9 is wound. In the case that slack is generated at the contact part of the V-belt 9 with the tension pulley 8, the lever member 3 is rotated clockwise in FIG. 1 by the force of the torsion coil spring 7 in order to absorb the slack. At the rotation of the lever member 3, since the fixed pulley 1 is incapable of rotating, the tension T2 of the left span may be increased in proportion to the force of the torsion coil spring 7. However, an increase of the tension T2 is absorbed by a counterclockwise rotation of the movable pulley 2 around the offset axis 03. In detail, the movable pulley 2 rotates in a direction that the distance t2 between the centers 01, 02 of the fixed and movable pulleys 1, 2 is decreased, so that the tension of the belt 4 is not increased. Thus, the belt 4 and each pulley 1, 2 contact each other only by the initial tension applied by the initial tension applying spring 5 and the distance t2 is deceased, so that a slip is generated between at least one of the pulleys 1, 2 and the belt 4, thereby permitting the clockwise rotation of the lever member 3. That is, the lever member 3 rotates to the position at which the tension of the V-belt 9 is proportional to the force of the torsion coil spring 7 so that the tension pulley 8 presses the V-belt 9 to absorb the slack. As a result, the tension of the V-belt 9 is maintained to a stable value at any time even in the case that such a slack is generated. This stables the driving of the auxiliaries. Accordingly, according to this embodiment of the auto-tensioner, a tension maintaining operation of the V-belt 9 can be promptly carried out, without substantially generating damping force in a rotating direction of the lever member 3, said direction being required in such the case that the slack is generated on the V-belt 9.

On the other hand, when the auxiliaries are deactivated in the above-mentioned state, loads of the pulleys for driving the auxiliaries over which the V-belt 9 is wound are removed, so that the tension at the contact part of the V-belt 9 with the tension pulley 8 may be increased. In such a case, great force B opposing the force of the torsion coil spring 7 acts via the tension pulley 8 so as to rotate the lever member 3 counterclockwise in FIG. 1. In this case, since the fixed pulley 1 is incapable of rotating, the tension T1 of the right span is increased in proportion to drag from the V-belt 9. An increase of the tension T1 acts as rotating force which rotates the movable pulley 2 clockwise around the offset axis 03. However, since such a rotating force acts in a direction that the distance t2 between the centers 01, 02 of the fixed and movable pulleys 1, 2 is gradually increased, the movable pulley 2 cannot rotate unless an extension generates on the belt 4. Thus, the rotating force increases the tension T2 of the left span. In other words, by the increase of the tension T1, the rotating force to be applied to the movable pulley 2 is converted into the tension T2.

In this way, since the tension T2 is also increased at a set ratio in proportion to the increase of the tension T1, the tension of the belt 4 is increased as a whole, so that application force of the belt 4 to respective pulleys 1, 2 is increased, thereby generating high grip between the belt 4 and respective pulleys 1, 2. Thus, great damping force (rotating reaction force) is generated with respect to the force B which acts on the lever member 3 from the V-belt 9, so that the counterclockwise rotation of the lever member 3 is prevented unless a slip generates between the belt 4 and at least one of the pulleys 1, 2.

Further, accompanying the generation of the above high grip, a shaft load (an allow C shown in FIG. 1) acts on the offset axis 03 of the movable pulley 2. The shaft load is a resultant of the tension T1, T2 of the right and left spans, and generates rotation torque for rotating the lever member 3 clockwise. The rotation torque becomes reaction force D acting in the direction opposite to the force B acting on the lever member 3 from the V-belt 9. Accordingly, the reaction force D also generates great damping force (rotating reaction force) with respect to the force B acting on the lever member 3, so that the counterclockwise rotation of the lever member 3 is prevented unless a slip generates between the belt 4 and at least one of the pulleys 1, 2.

In the case that great force overcoming the grip between the belt 4 and respective pulleys 1, 2 acts as the force B from the V-belt 9 on the lever member 3, a slip is generated between the belt 4 and at least one of the pulleys 1, 2, so that a balance between the force B from the V-belt 9 and its reaction force D is lost. Thus, the lever member 3 commences rotating counterclockwise. Since the damping force due to the increase of the tension T1, T2 is generated even at the rotation of the lever member 3 due to generation of the slip, a balance between the external force and the damping force causes a slight amount of slip per unit time, so that the lever member 3 is gradually returned to an initial position. Thus, the V-belt 9 is gradually returned to an initial tension state.

Accordingly, by restricting the rotation of the lever member 3 in the case that the tension of the V-belt 9 is increased, the tension of the V-belt 9 can be controlled while the flap of the V-belt 9 is avoided. As a result, according to this embodiment of an auto-tensioner, in such a case that the tension of the V-belt 9 is increased, great damping force is generated in a rotating direction of the lever member 3, thereby obtaining a stable running of the V-belt 9.

A value of external force B with which the lever member 3 commences rotating is arbitrarily obtained by appropriately setting conditions such as an offset amount of the offset axis 03, kind of the belt 4 and an amount of force of the initial tension applying spring 5. In detail, as the offset dimension t1 of the offset axis 03 is increased, an increasing ratio of T2 with respect to an increase of T1 becomes smaller, so that the value of the external force B with which the lever member 3 commences rotating becomes smaller. Further, for the kind of the belt 4, a ribbed belt as compared with a V-belt and a flat belt as compared with a ribbed belt have smaller grip with respect to the belt tension to provide smaller values of the external force B with which the lever member 3 commences rotating, respectively. Furthermore, as the force of the initial tension applying spring 5 is decreased, grip with respect to the increase of T1 becomes smaller, so that the value of the external force B with which the lever member 3 commences rotating becomes smaller. Accordingly, according to the setting of the above conditions, the rotation of the lever member 3 can be commenced even at the time that slight external force B acts.

As described above, this embodiment of an auto-tensioner can be so composed that damping force with respect to the rotation of the lever member 3 in a direction that the slack of the V-belt 9 is absorbed is small and that damping force with respect to rotating force applied to the lever member 3 by increase of tension of the V-belt 9 is large, thereby obtaining high damping characteristics acting in a single direction.

This embodiment of an auto-tensioner has a simple structure similar to a belt transmission mechanism so composed that a transmission belt is wound between two pulleys. Accordingly, the number of parts is small and assembly work can be readily made. Further, since damping force is changed according to change of tension of respective spans, damping characteristics can be changed by adjusting variations of tension of the spans, thereby readily changing the setting of damping characteristics. Furthermore, since damping force can be generated without using an operating medium readily affected by change of temperature, such as operating oil for a hydraulic auto-tensioner, damping characteristics difficult to be affected by change of temperature can be obtained. Since a slip is generated between the belt and at least one of the pulleys in order to cope with excessive external force, this acts as a fail-safe function. In addition, a piston rod as in a hydraulic damping mechanism is not required, thereby achieving size reduction. Mounting of this auto-tensioner on the engine is made at a single position, thereby simplifying mounting work.

Figure 4:
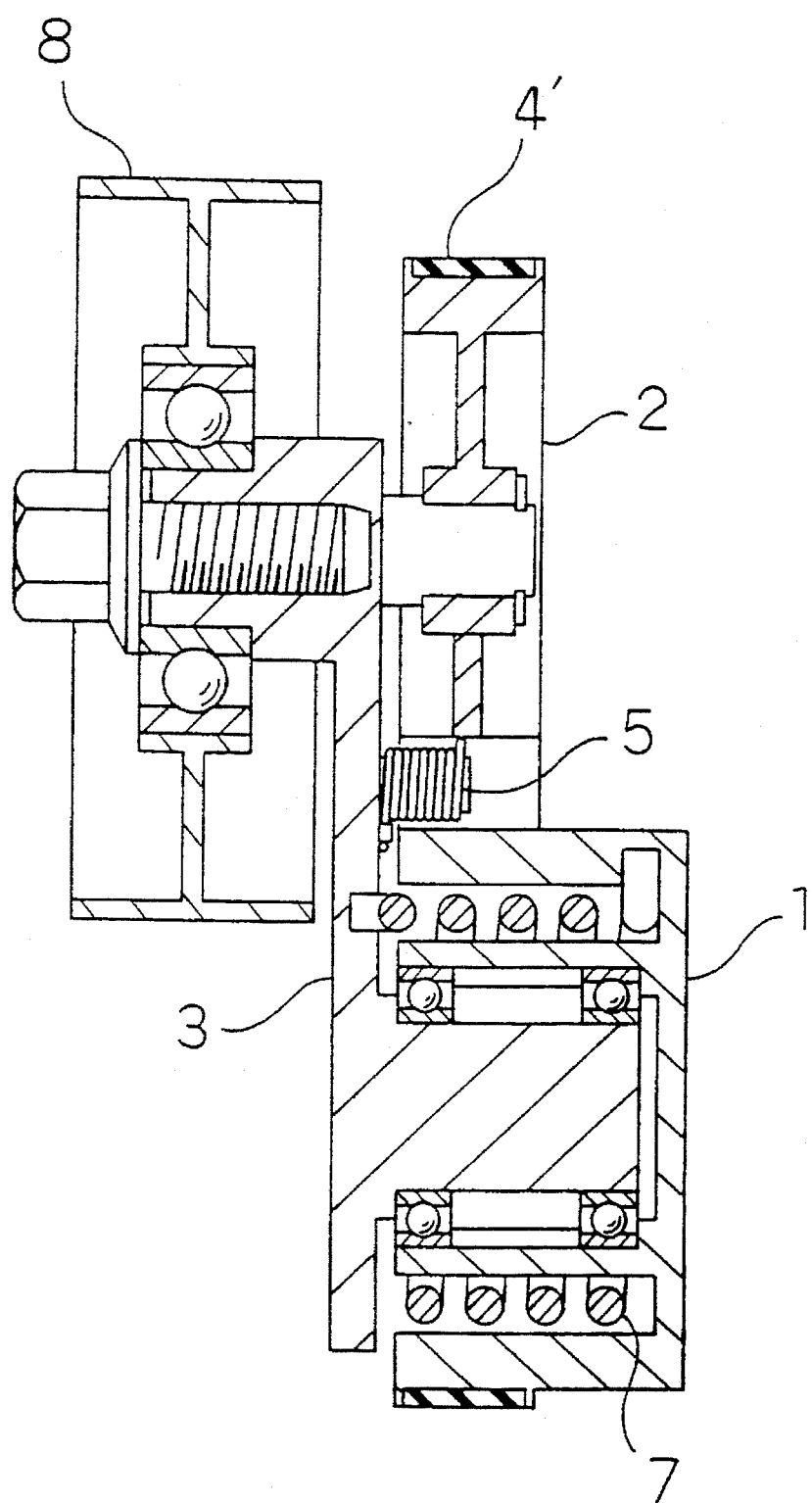

As a modification of this kind of auto-tensioner, the case of using a flat belt 4' instead of a ribbed belt is shown in FIG. 4. With such a structure, similar to the above embodiment, a ratio of increase of grip with respect to an increase of a belt tension can be set relatively small, so that a value of drag of the V-belt 9 with which the lever member 3 commences rotating can be set small. That is, the rotation of the lever member 3 can be commenced at the time relatively small drag of the V-belt 9 acts, so that the time required for returning the tension of the V-belt 9 to an initial state can be shortened while flap of the V-belt 9 is avoided. Accordingly, by changing the kind of the belt 4, damping characteristics can be arbitrarily set.

Modifications

Description will be made next about three types of modifications which are improvements of the above embodiment. Since basic structures of respective modifications are the same as in the above embodiment, description is made about only different parts in respective modifications.

Figure 5:
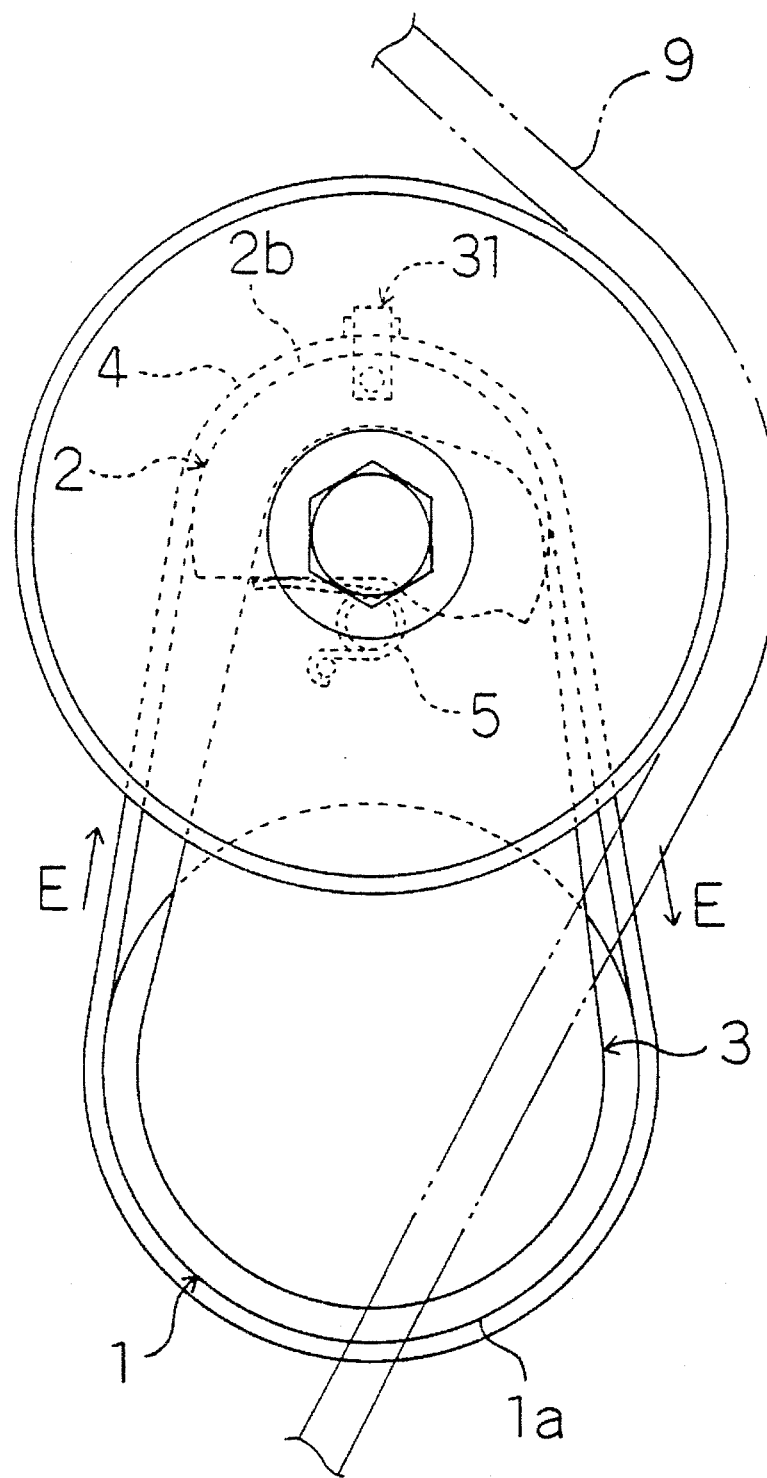
Figure 6:
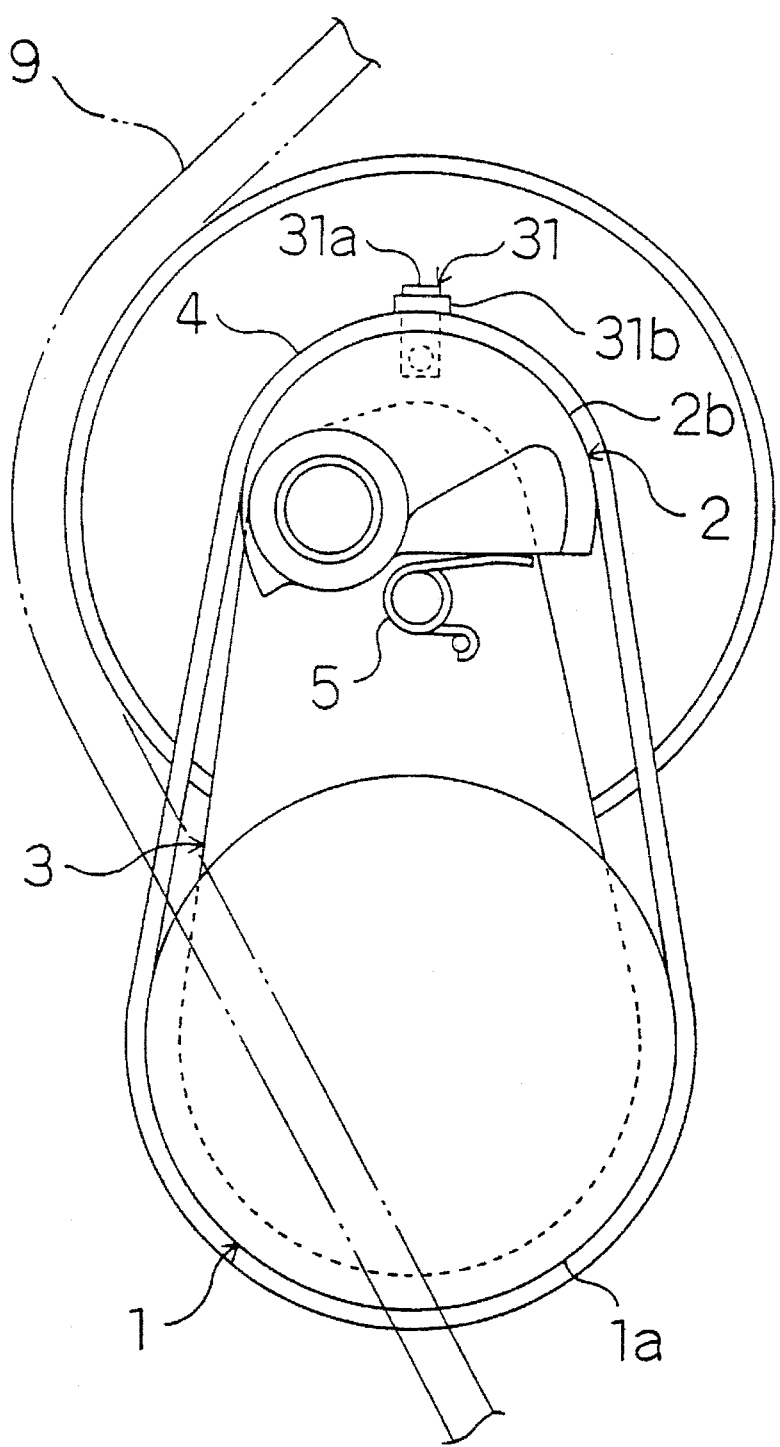
Figure 7:
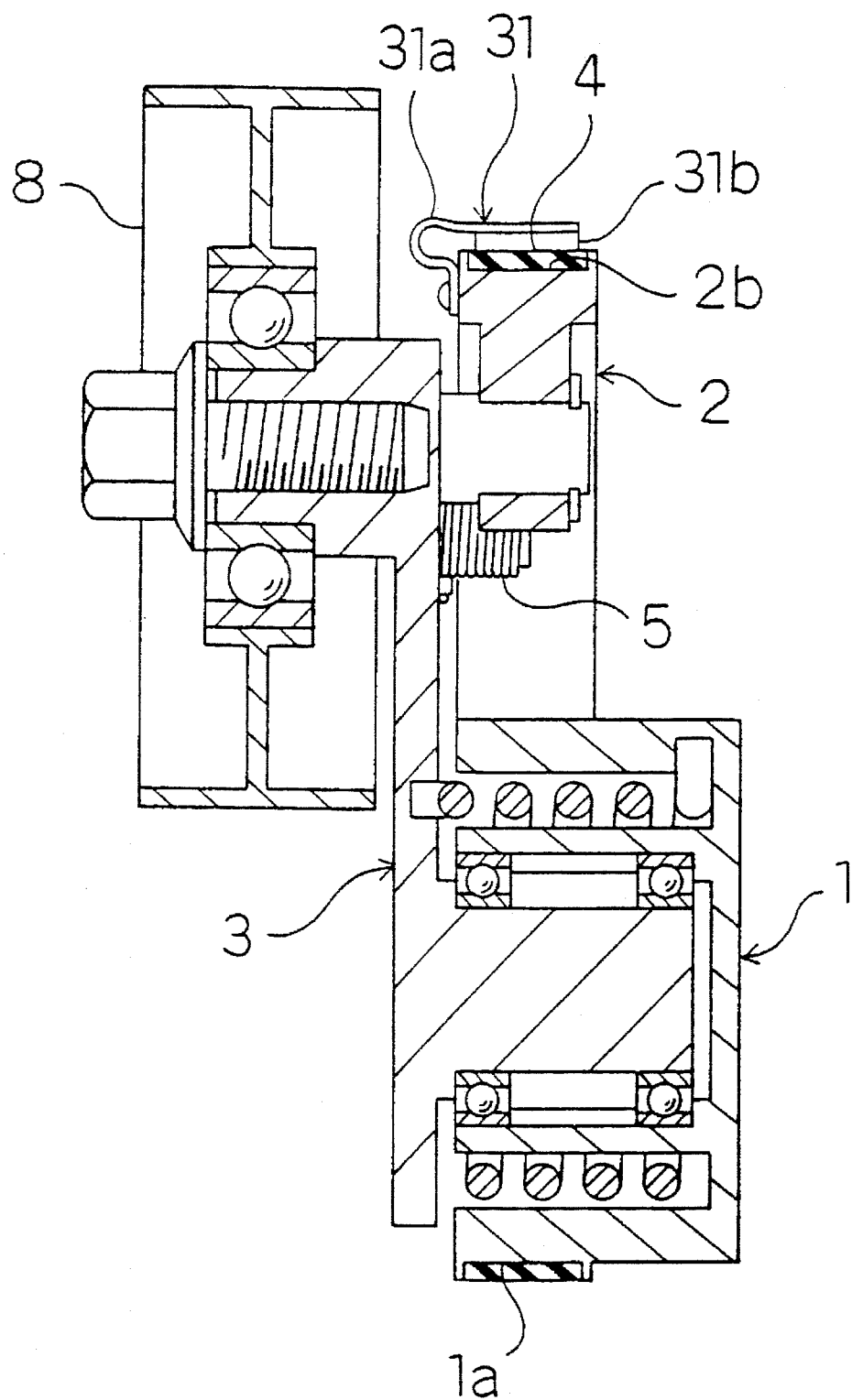

First, description is made about a first type modification. As shown in FIGS. 5 to 7, in this modification, the movable pulley 2 is shaped in a half-round and is smaller in diameter than the fixed pulley 1. Specifically, in this modification, the dimension of the diameter of the movable pulley is set to approximately 70% of the fixed pulley 1. With this structure, a contact area of the belt 4 with the friction surface 2b of the movable pulley 2 is smaller than a contact area of the belt 4 with the friction surface 1a of the fixed pulley 1. Thus, this modification is fundamentally so composed that a slip is generated between the friction surface 2b of the movable pulley 2 and the belt 4 at the rotation of the lever member 3.

As a feature of this modification, a belt holding member 31 as a one-way restricting means is mounted at the movable pulley 2. The belt holding member 31 is composed of an arm part 31a and a contact part 31b fixed to the arm part 31a. The arm part 31a is fixed at an end thereof by a machine screw to an upper end of the front side surface of the movable pulley 2. The other end of the arm part 31a is bent on the rear side and is positioned opposite to the friction surface 2b of the movable pulley 2. The contact part 31b is fixed to a lower surface of the other end of the arm part 31a and contacts at a lower end surface the back face of the belt 4 wound over the friction surface 2b of the movable pulley 2, thereby pressing the belt 4 against the friction surface 2b. The pressing force which presses the belt 4 against the friction surface 2b is set so as to generate a slip between the friction surface 1a of the fixed pulley 1 and the belt 4 without generating a slip between the friction surface 2b of the movable pulley 2 and the belt 4 at the clockwise rotation in FIG. 5 of the lever member 3.

With such a structure, at the operation of the auto-tensioner, when the lever member 3 rotates clockwise in FIG. 5, the belt holding member 31 prevents generation of slip between the friction surface 2b of the movable pulley 2 and the belt 4, so that the lever member 3 rotates while a slip is generated between the friction surface 1a of the fixed pulley 1 and the belt 4. On the contrary, when the lever member 3 rotates counterclockwise in FIG. 5, the belt 4 is pressed against the friction surface 2b of the movable pulley 2 by increase of the belt tension, so that the application force of the belt 4 to the respective pulleys 1, 2 is not substantially affected by the belt holding member 31. In such a contact state of the belt 4 with respective pulleys 1, 2, since the movable pulley 2 is smaller in diameter than the fixed pulley 1, a slip is generated between the friction surface 2b of the movable pulley 2 and the belt 4 without generating a slip between the friction surface 1a of the fixed pulley 1 and the belt 4. Such an operation successively causes accompanying swing motion of the lever member 3. In detail, a slip is generated at the fixed pulley 1 at the clockwise rotation in FIG. 5 of the lever member 3, while a slip is generated at the movable pulley 2 at the counterclockwise rotation in FIG. 5 of the lever member 3. Thus, the belt 4 is circulated between both the pulleys 1, 2 in a direction of an allow E shown in FIG. 5. Accordingly, the contact parts of the belt 4 with respective pulleys 1, 2 are changed, so that it is avoided that only specific parts of the belt 4 contact respective pulleys 1, 2 at any time to degenerate locally, thereby increasing a life of the belt 4.

Instead of the above structure, there may be the case that the fixed pulley 1 is smaller in diameter than the movable pulley 2 and the belt holding member 31 is mounted on the fixed pulley 1. In this case, a slip is generated at the movable pulley 2 at the clockwise rotation in FIG. 5 of the lever member 3, while a slip is generated at the fixed pulley 1 at the counterclockwise rotation in FIG. 5 of the lever member 3. Accordingly, even in this case, it is avoided that only specific parts of the belt 4 contact respective pulleys 1, 2 at any time to degenerate locally, thereby increasing a life of the belt 4. In this case, the circulating direction of the belt 4 is opposite to the former case.

In this modification, by making a difference in diameter between the pulleys 1, 2, a slip is generated at the pulley 1, 2 to which the belt holding member 31 is fixed when the lever member 3 rotates counterclockwise in FIG. 5. Instead of such a manner, however, by making a difference in friction coefficient between the belt 4 and respective pulleys 1, 2, a slip can be generated at the pulley 1, 2 to which the belt holding member 31 is fixed.

Figure 8:
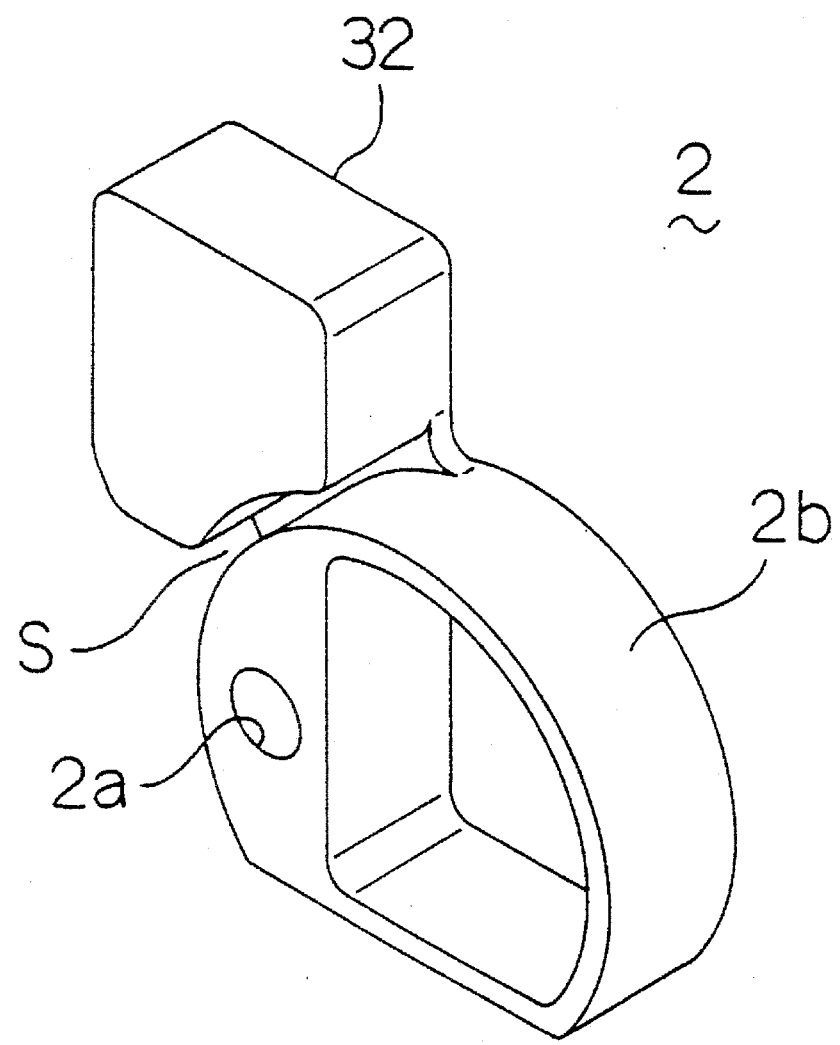
Figure 12:
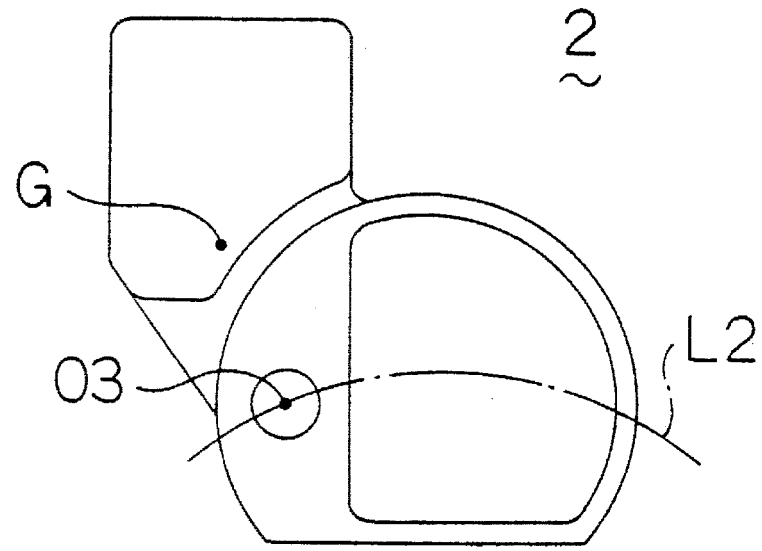
Figure 13:
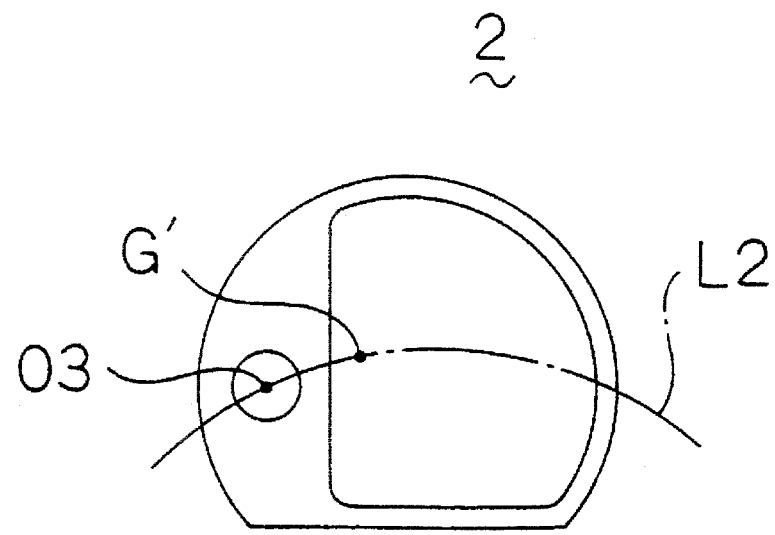

Description is made next about a second type modification. As shown in FIGS. 8 to 12, in this modification, damping characteristics are improved, in particular, by changing the form of the movable pulley 2. Specifically, as shown in FIG. 8, the movable pulley 2 is formed at the inside into a hollow and is integrally attached at an upper end thereof to a weight member 32. In detail, the inside of the movable pulley 2 is cut out in a substantially fan-shaped at the sight from the front to reduce the main part in weight, and then the weight member 32 with relatively large weight is attached to an edge portion in a width direction of the friction surface 2b in which interference is not made with the belt 4. Between a lower end of the weight member 32 and the friction surface 2b of the movable pulley 2, a clearance S is formed for disposing the belt 4. With such a structure, as shown in FIG. 12, the gravity center G of the movable pulley 2 as a whole is positioned upward as compared with the above-mentioned embodiment having a shape as shown in FIG. 13 (See G of FIG. 12 and G' of FIG. 13). The gravity center G is positioned on an outer peripheral side with respect to a moving locus L2 of the offset rotation center of the movable pulley 2 at the rotation of the lever member 3.

Next, description is made about a damping operation according to the above structure. When the reaction force (shown in an allow B in FIG. 9) from the V-belt 9 acts, in the case that the reaction force B from the V-belt 9 is a static load accompanying no shock, set damping force is obtained by grip between the belt 4 and respective pulleys 1, 2 due to increase of the belt tension, as in the above-mentioned embodiment.

Figure 9:
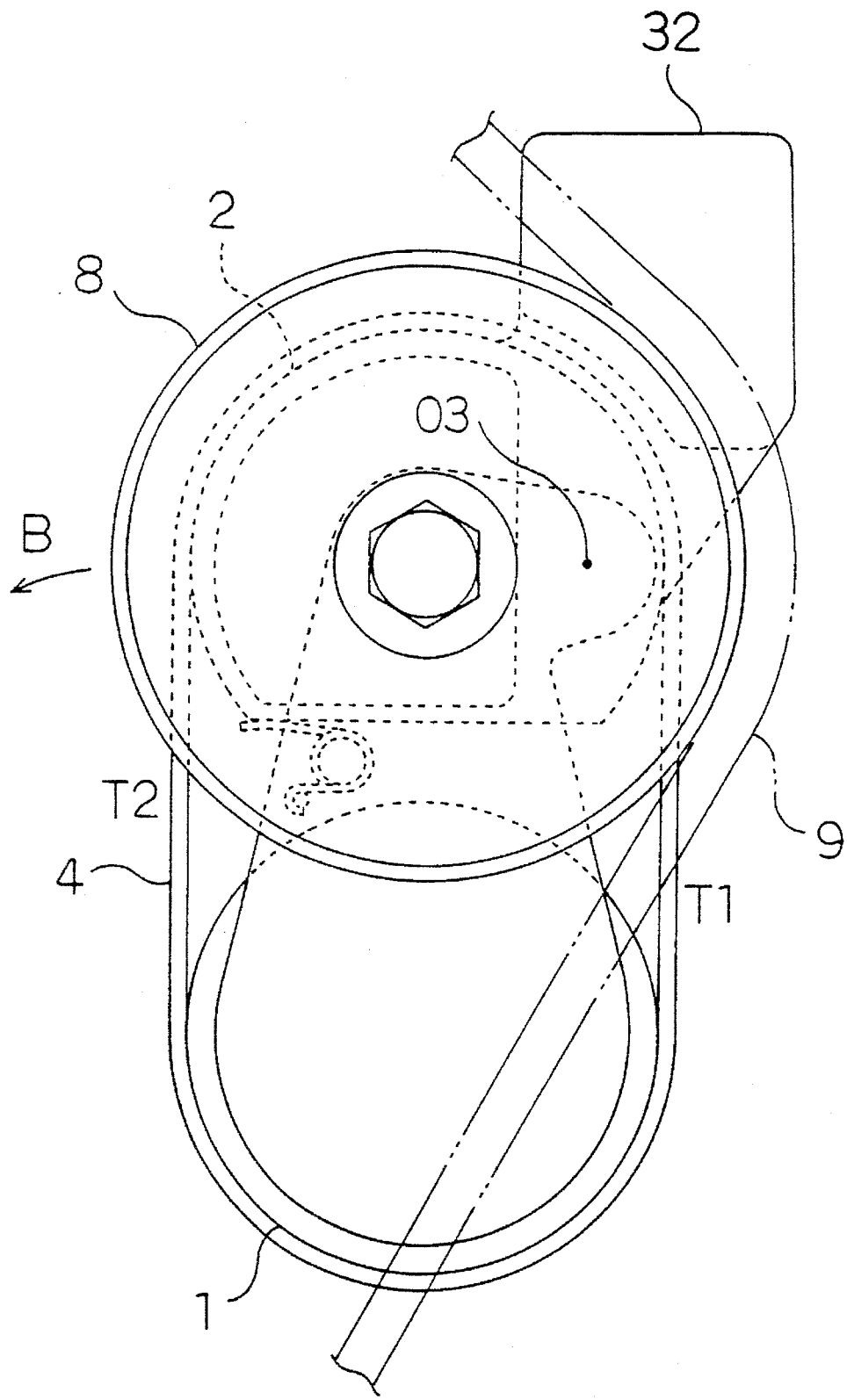
Figure 10:
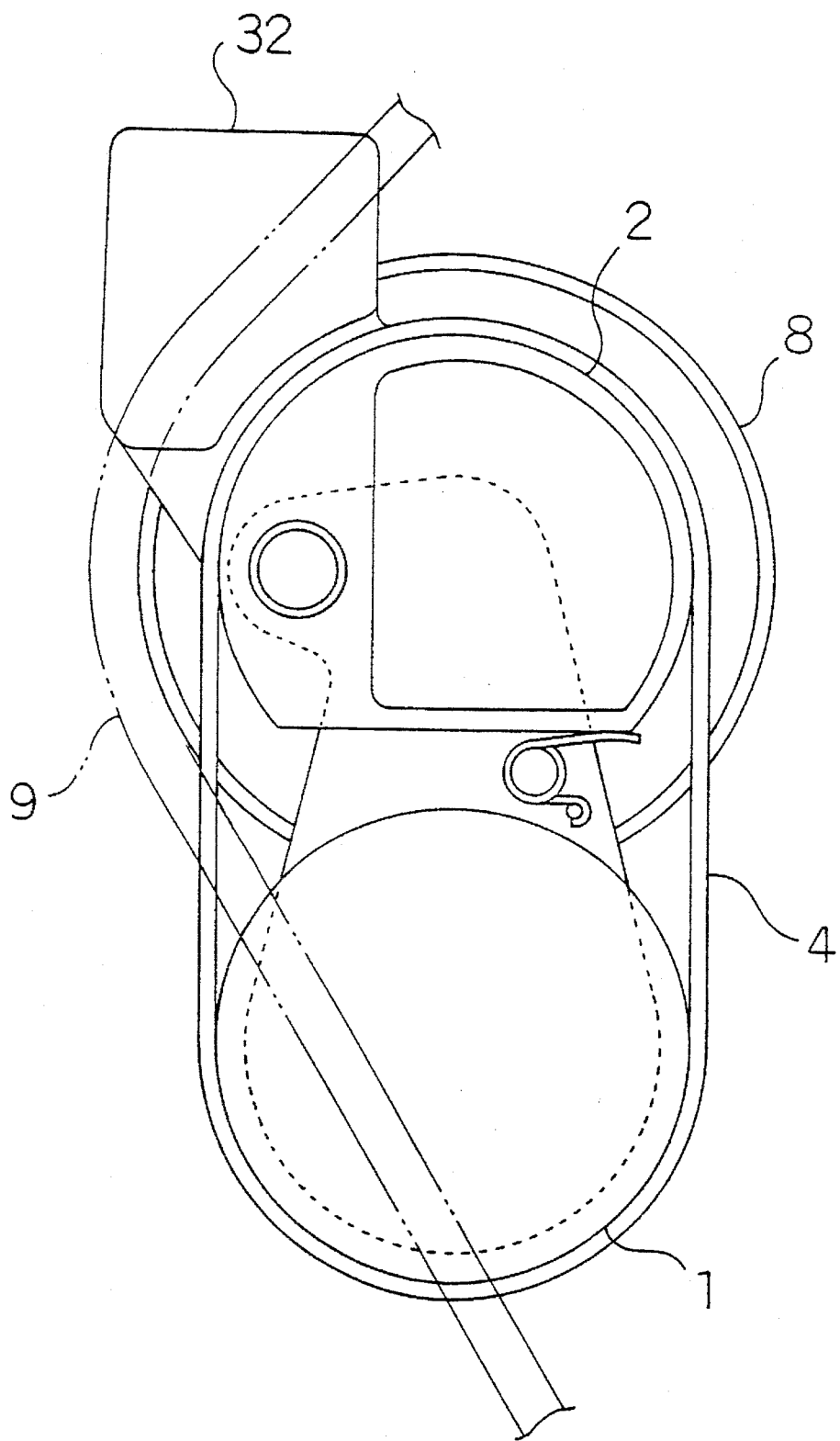
Figure 11:
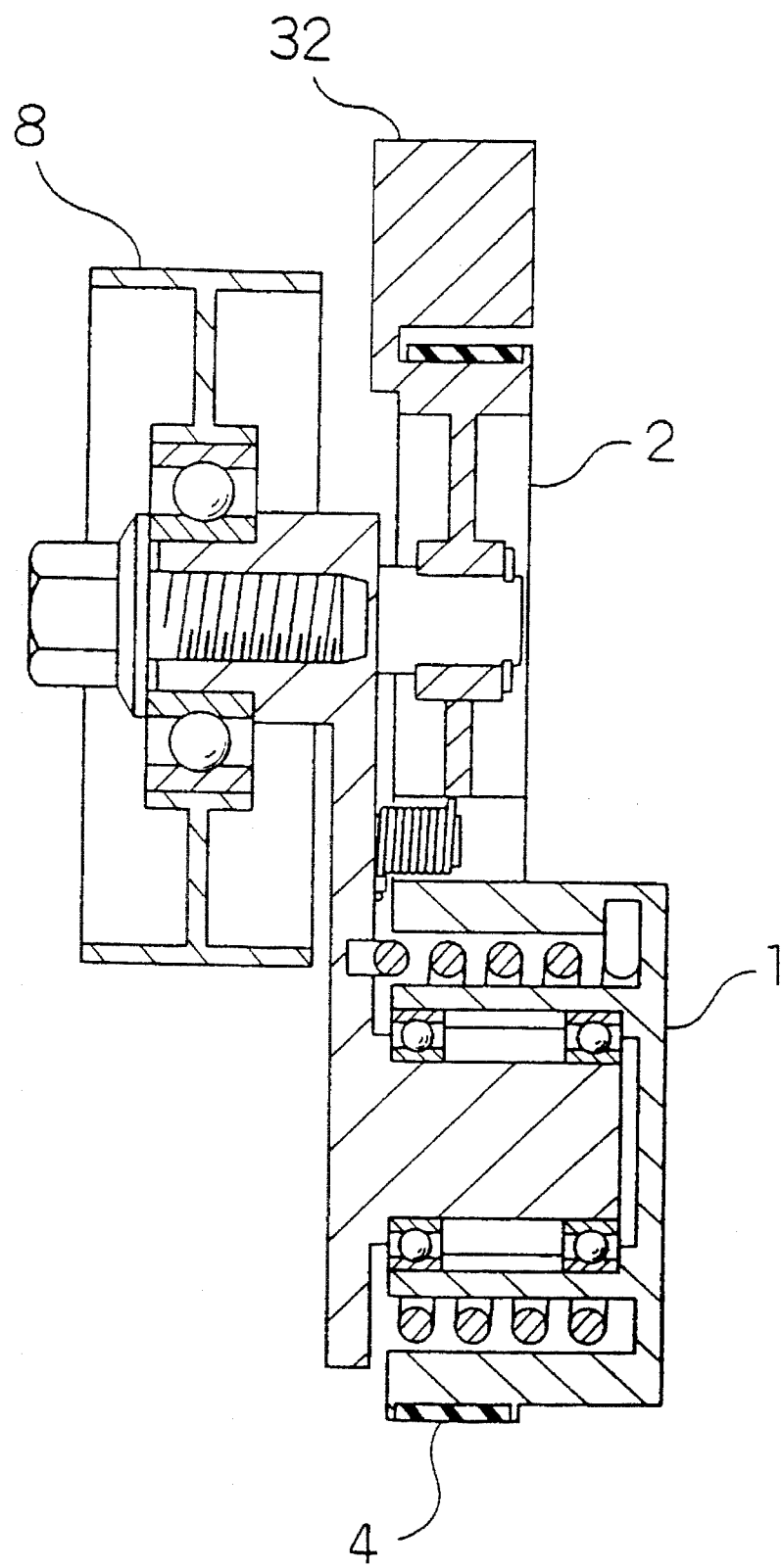

On the contrary, in the case that the reaction force B from the V-belt 9 is a load accompanying shock, since the gravity center of the movable pulley 2 is positioned on an outer peripheral side with respect to the moving locus of the offset rotation center of the movable pulley 2 at the rotation of the lever member 3, the movable pulley 2 rotates by its inertial force clockwise in FIG. 9 around the offset axis 03. That is, the shaft load is increased. As also mentioned in the above embodiment, the tension T2 of the left span of FIG. 9 is increased at a set ratio, according to the increase of the tension T1 of the right span due to the action of the above load. Thus, the factor that increases the shaft load generates at two positions, so that the shaft load is further increased in the case that the load with shock acts, as compared with the case that the static load acts. Accordingly, in the case that the load with shock acts, grip between the belt 4 and respective pulleys 1, 2 becomes larger thereby generating larger damping force, as compared with the case that the static load acts.

As described above, with the structure of this modification, in the case that the reaction force from the V-belt 9 is a load with shock, large damping force can be generated with respect to the load, so that dependence of the damping force with respect to the speed of the load can be presented. Accordingly, generation of the situation that the lever member 3 rotates accidentally with respect to the load with shock can be avoided.

Description is made next about a third type modification. In this modification, a pair of damping mechanisms as above-mentioned are provided, the offset rotation axes of respective movable pulleys are made a difference in offset direction from each other, and the lever member is shared between both the damping mechanisms. With this structure, set damping force can be generated with respect to both the rotating directions of the lever member. That is, if a pair of the mechanisms shown in FIG. 3 are provided back to back with each other, the same action as in the above-mentioned embodiment can be performed in respective damping mechanism in the opposite direction to each other. In detail, when the lever member 3 rotates clockwise in FIG. 1, damping force which restricts the rotation is generated at one of the damping mechanisms. On the contrary, when the lever member 3 rotates counterclockwise in FIG. 1, damping force which restricts the rotation is generated at the other damping mechanism. That is, the fixed pulley, the movable pulley, the belt and the initial tension applying spring of one damping mechanism in this modification correspond to a first fixed pulley, a first movable pulley, a first friction member and a first forcing member in this invention, respectively. The fixed pulley, the movable pulley, the belt and the initial tension applying spring of the other damping mechanism in this modification correspond to a second fixed pulley, a second movable pulley, a second friction member and a second forcing member in this invention, respectively.

As described above, according to this modification, damping force can be performed in both the rotating directions, and the amount of damping force in each rotating direction can be arbitrarily set by setting an offset amount of the offset rotation axis of the movable pulley 2, kind of the belt 4, and an amount of force with which the initial tension applying spring 5 forces to rotate. In particular, if damping force with respect to the rotating direction at the decrease of tension of the V-belt 9 is set to a relatively small amount and damping force with respect to the rotating direction at the increase of tension of the V-belt 9 is set to a relatively large amount, the stable running of the V-belt 9 can be obtained at the increase of tension of the V-belt 9, while abrupt variations in contact pressure of the tension pulley 8 to the V-belt 9 at the decrease of tension of the V-belt 9 can be restricted thereby restricting degradation of the V-belt 9.

In this modification, an endless friction member is used as the friction member. However, a friction member with ends is also applicable. In this case, instead of the fixed pulley, a fixed plate to which both ends of the friction member are fixedly attachable is used.

Second Embodiment

Description will be made next about a second embodiment of an auto-tensioner of this invention, that is, about an application as an auto-tensioner composed so as to apply set tension to a timing belt for driving a cam shaft of an OHC engine.

Figure 14:
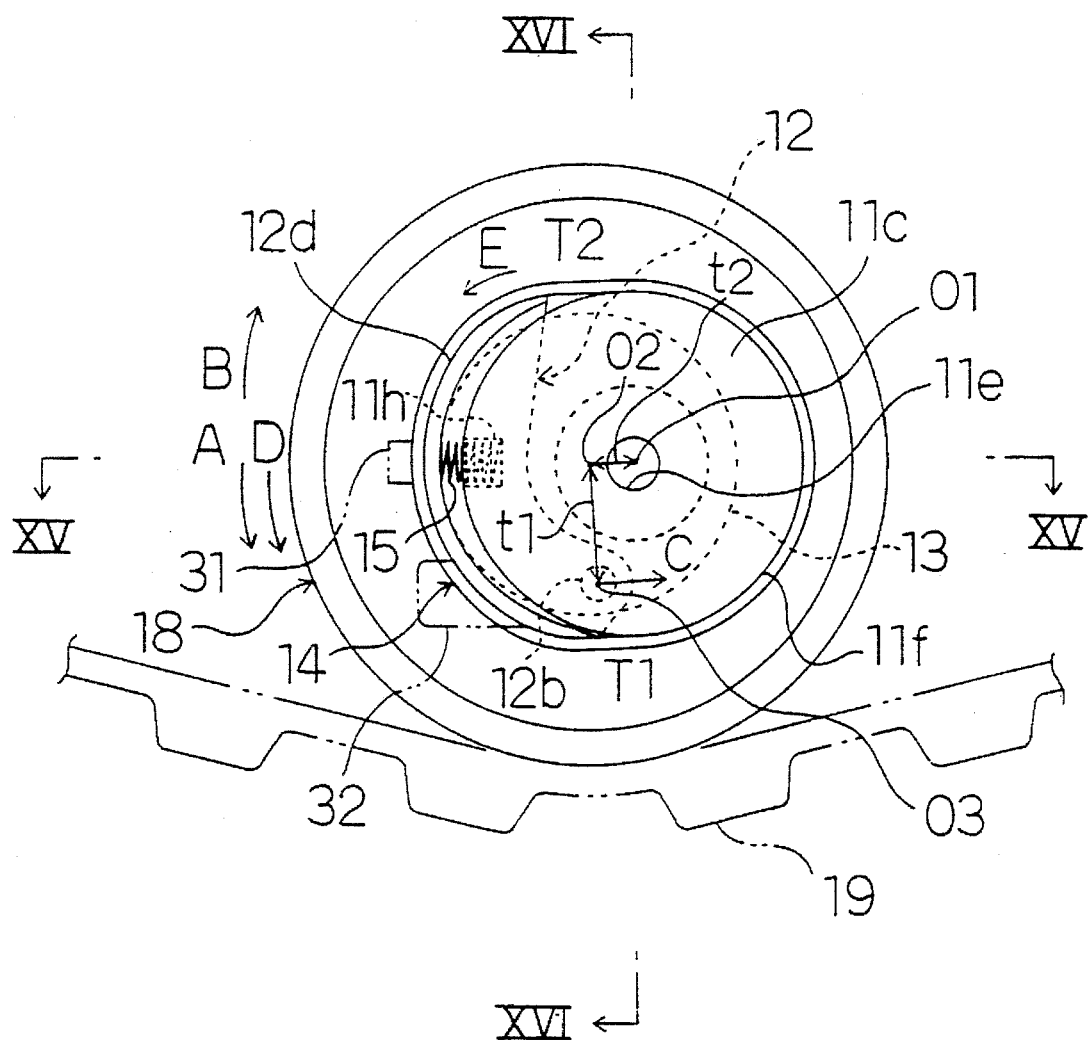
FIGS. 14 to 21 show a second embodiment.
Figure 15:
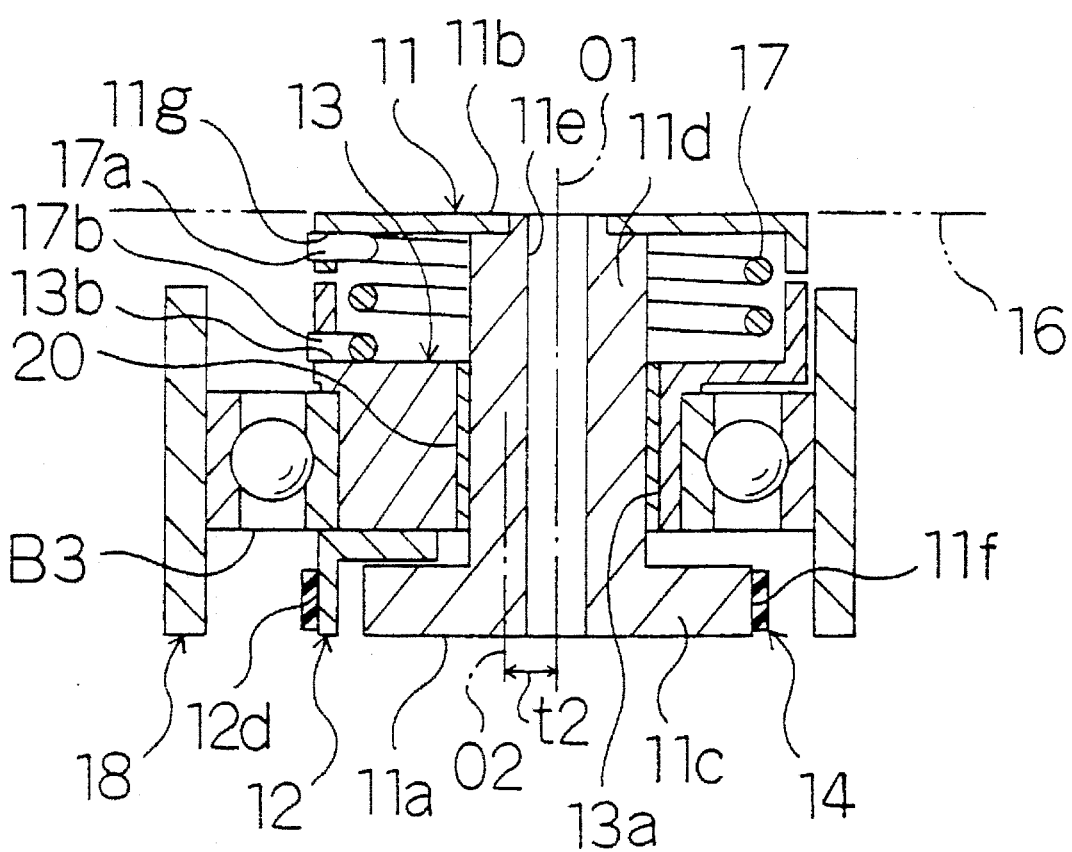
Figure 16:
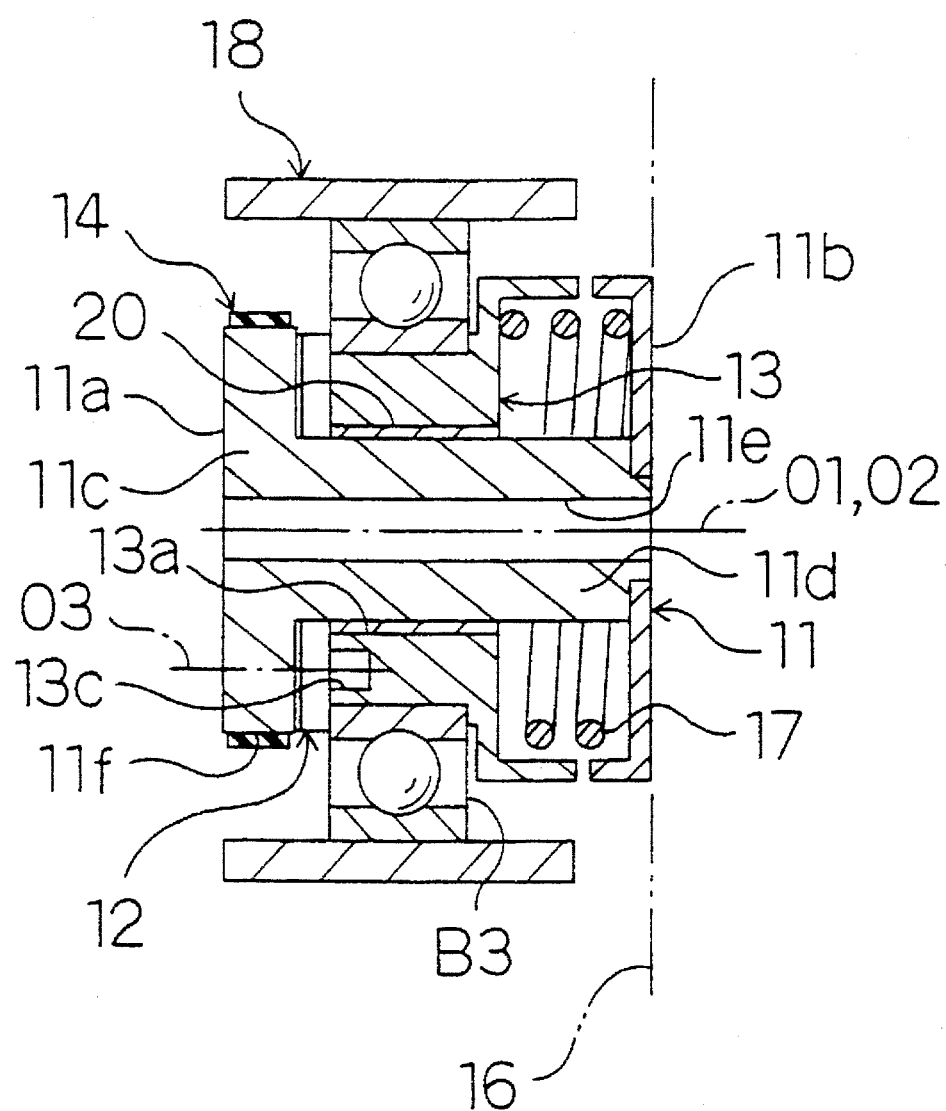
Figure 17:
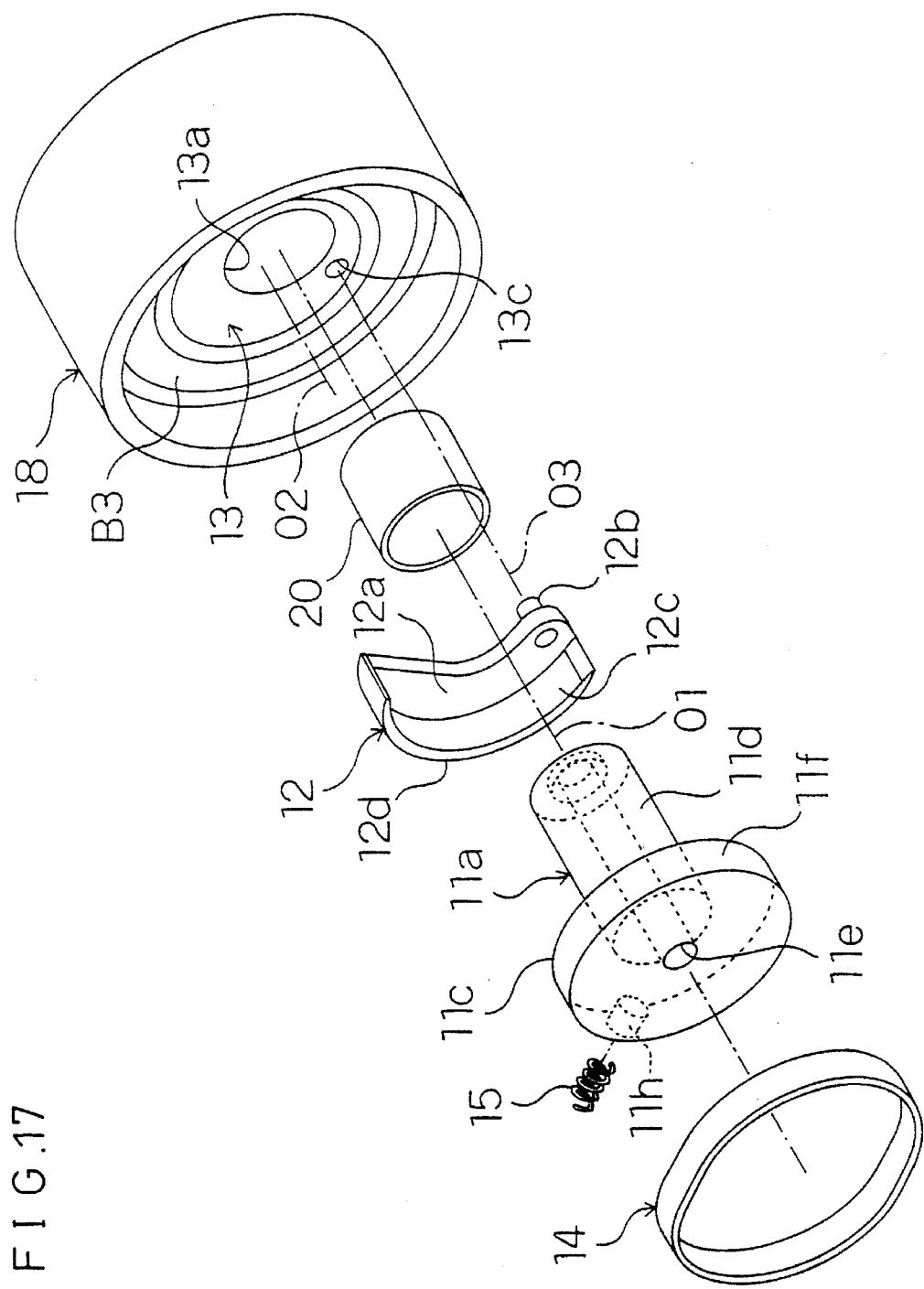

FIGS. 14 to 16 show the whole structure of the present embodiment of an auto-tensioner of this invention; FIG. 14 is a diagram showing a front side of the auto-tensioner (side on which the auto-tensioner does not oppose an engine block 16); FIG. 15 is a cross section taken along the line XV—XV of FIG. 14, wherein the lower side shows a front and the upper side shows a rear); and FIG. 16 is a cross section taken along the line XVI-XVI of FIG. 14, wherein the left side shows a front and the right side shows a rear. FIG. 17 shows an exploded perspective view of the auto-tensioner.

As shown in the above figures, this auto-tensioner comprises: a fixed member 11 fixed to the engine block 16 of the vehicle engine; an offset cylinder 13 which is disposed out-side of the fixed member 11 at a position offset from a central axis 01 of the fixed member 11; a torsion coil spring 17 as a resilience member contractedly placed between the fixed member 11 and the offset cylinder 13 to force to rotate the offset cylinder 13 counterclockwise in FIG. 14 with respect to the fixed member 11; a tension converting member 12 supported to the offset cylinder 13 rotatably around a rotation axis 03 thereof; a belt 14 wound between the fixed member 11 and the tension converting member 12; and a tension pulley 18 rotatably supported to the offset cylinder 13 for applying set tension to a timing belt 19 for driving a cam shaft of the engine. Detailed description is made below about the above members.

The fixed member 11 is so composed that a first fixed member 11a located on the front side and a second fixed member 11b located on the rear side are integrally assembled. The first fixed member 11a has: a pulley part 11c which is a relatively large in diameter and is flat and disc-shaped; and a shaft part 11d which is located on the rear side of the pulley part 11c, is relatively small in diameter and is longer than the pulley part 11c. A through hole 11e is formed so as to pass through respective center portions of the pulley part 11c and the shaft part 11d. An outer peripheral surface of the pulley part 11c is formed into a friction surface 11f over which the belt 14 is wound. The second fixed member 11b has a cup shape that a front side thereof (lower side in FIG. 15 or right side in FIG. 16) is opened, and is integrally attached at a central part thereof to a rear end part of the shaft part 11d. The second fixed member 11b is so fixed that a rear side surface thereof contacts the engine block 16, so that the whole fixed member 11 is fixed to the engine block 16. Further, in the vicinity to a bottom part of a side wall of the second fixed member 11b, a spring rear-side end holding hole 11g which passes through the side wall in a radial direction is formed.

The offset cylinder 13 is a cylindrical member and has an opening 13a at a position offset with respect to a center 02 thereof. The shaft part 11d of the fixed member 11 is inserted into the opening 13a via a sleeve member 20. Thus, the offset cylinder 13 is rotatably supported around the shaft part 11d of the fixed member 11 with a set offset mount (offset dimension t2). A rear end part of the offset cylinder 13 has a cup shape that a rear side of the offset cylinder 13 (upper side in FIG. 15 or right side in FIG. 16) is opened as opposed to the second fixed member 11b. In the vicinity to a bottom part of a side wall of the offset cylinder 13, a spring front-side end holding hole 13b which passes through the side wall in a radial direction is formed. Further, on an end surface of the front side of the offset cylinder 13, a shaft hole 13c for rotatably supporting the tension converting member 12 is formed.

The torsion coil spring 17 is formed, if seen from the front side, in a left hand wind from a rear side end 17a toward a front side end 17b, and is contractedly placed in such a manner that the rear side end 17a located on the rear side is fitted into the spring rear-side end holding hole 11g of the second fixed member 11b and the front side end 17b located on the front side is fitted into the spring front-side end holding hole 13b of the offset cylinder 13, thereby forcing to rotate the offset cylinder 13 in a set direction (counterclockwise in FIG. 14) with respect to the fixed member 11.

The tension pulley 18 is rotatably supported to an outer peripheral part of the offset cylinder 13 via a bearing B3. The timing belt 19 wound between a crank shaft (no-shown) and a cam pulley (no-shown) to drive a cam shaft of an engine is wound over the tension pulley 18 as shown in an imaginary line of FIG. 14. The tension pulley 18 is designed so as to press the timing belt 19 by the force of the torsion coil spring 17 thereby applying set tension to the timing belt 19.

Figure 18:
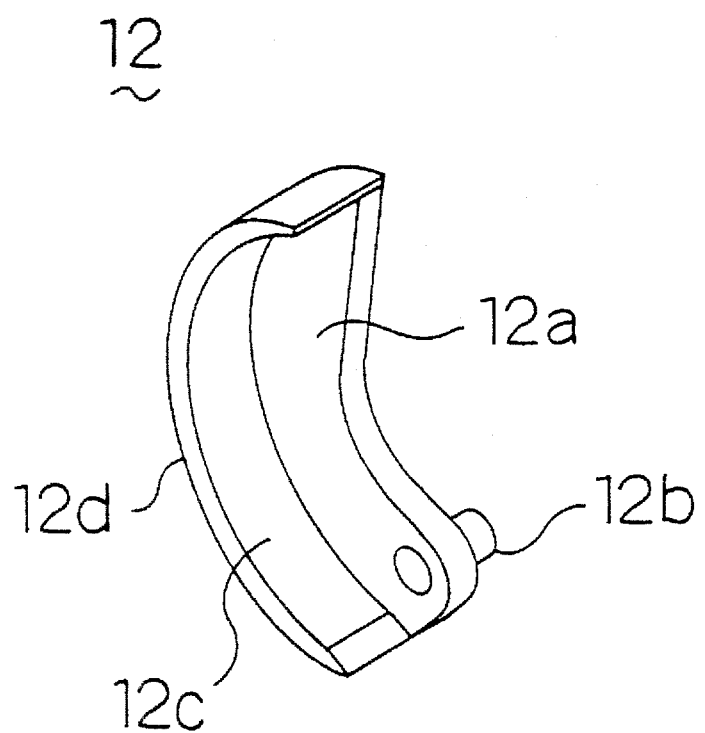

As shown in FIG. 18, the tension converting member 12 has a base part 12a formed of a substantially crescent-shaped plate and a rotation shaft 12b protruded from a back side of the base part 12a. The tension converting member 12 is so composed that the rotation shaft 12b is fitted into the shaft hole 13c of the offset cylinder 13, so as to be rotatable around the rotation shaft 12b. At an outer peripheral edge part of the base part 12a, a friction member part 12c having a substantially arcuate outer peripheral surface extending toward the front side is integrally formed. The outer peripheral surface of the friction member part 12c serves as a friction surface 12d.

A feature of the tension converting member 12 is that a rotation center 03 thereof is offset by a set dimension t1 downward in FIG. 14 with respect to the center 02 of the offset cylinder 13. In detail, the rotation shaft 12b protruded from the back of the base part 12a is positioned in the vicinity of one side part in a length direction of the base part 12a. Thus, when the tension converting member 12 rotates clockwise in FIG. 14 around the offset axis 03, a distance t2 between the center of the arc of the friction surface 12d of the tension converting member 12 (position substantially matching with 02 in FIG. 14) and the center 01 of the fixed member 11 is gradually decreased. On the contrary, when the tension converting member 12 rotates counterclockwise, the distance t2 is gradually increased.

The belt 14 is wound over both the friction surfaces 11f, 12d of the fixed member 11 and the tension converting member 12.

Between the fixed member 11 and the tension converting member 12, an initial tension applying spring 15 is provided as a forcing member for applying set initial tension to the belt 14. In detail, a concave part 11h for inserting a spring is formed at a position opposite to the tension converting member 12 on the outer peripheral surface of the pulley part 11c of the fixed member 11. The initial tension applying spring 15 formed of a coil spring is housed in the concave part 11h, and is contractedly placed between a bottom of the concave part 11h and an inner surface of the friction member part 12c of the tension converting member 12. Thus, the force of the initial tension applying spring 15 acts as force which rotates the tension converting member 12 counterclockwise in FIG. 14 around the offset axis 03. In other words, the initial tension applying spring 15 applies set tension to the belt 14 by its force which forces to rotate in a direction that the distance t2 between the center of the arc of the tension converting member 12 and the center 01 of the-fixed member 11 is gradually increased, so that the set tension is obtained as initial tension in a state that no external force acts on the belt 14. Further, the force of the initial tension applying spring 15 is set to a value at which set friction force is obtained between the belt 14 and the friction surface 11f of the fixed member 11 and between the belt 14 and the friction surface 12d of the tension converting member 12.

Next, description is made about an operation of the auto-tensioner for timing belt having the above structure. Here, in relation to the belt 14 wound between the pulley part 11c of the fixed member 11 and the friction member part 12c of the tension converting member 12, it is assumed that tension of a lower span of FIG. 14 is T1 and tension of an upper span of FIG. 14 is T2.

Since the offset cylinder 13 is given force A acting counterclockwise in FIG. 14 by the force of the torsion coil spring 17, the tension pulley 18 over which the timing belt 19 is wound rotates accompanying the running of the timing belt 19 while applying the pressing force to the timing belt 19.

Then, there is the case that slack is generated at the contact part of the timing belt 19 with the tension pulley 18 from the above state, according to change of driving state of the engine. In this case, the offset cylinder 13 is rotated counterclockwise in FIG. 14 by the force of the torsion coil spring 17 in order to absorb the slack. At the rotation of the offset cylinder 13, since the fixed member 11 is incapable of rotating, the tension T2 of the upper span may be increased in proportion to the force of the torsion coil spring 17. However, an increase of the tension T2 is absorbed by a clockwise rotation of the tension converting member 12 around the offset axis 03. In detail, the tension converting member 12 rotates in a direction that the distance t2 between the center of the arc of the tension converting member 12 and the center 01 of the fixed member 11 is decreased, so that the tension of the belt 14 is not increased. Thus, the belt 14 and each friction surface 11f, 12d in the fixed member 11 and the tension converting member 12 contact each other only by the initial tension applied by the initial tension applying spring 15 and the distance t2 is deceased, so that a slip is generated between at least one of the friction surfaces 11f, 12d and the belt 14, thereby permitting the counterclockwise rotation of the offset cylinder 13. That is, the offset cylinder 13 rotates to the position at which the tension of the timing belt 19 is proportional to the force of the torsion coil spring 17 so that the tension pulley 18 presses the timing belt 19 to absorb the slack. As a result, the tension of the timing belt 19 is maintained to a stable value at any time even in the case that such a slack is generated. This presents a stable synchronous rotation state between the crankshaft and the cam pulley which are synchronously rotated by the timing belt 19. Consequently, according to this embodiment of the auto-tensioner, a tension maintaining operation of the timing belt 19 can be promptly carried out, without substantially generating damping force in a rotating direction of the offset cylinder 13, said direction being required in such the case that the slack is generated on the timing belt 19.

On the other hand, the tension at the contact part of the timing belt 19 with the tension pulley 18 may be increased from the above-mentioned state according to change of driving state of the engine. In such a case, great force B opposing the force of the torsion coil spring 17 acts via the tension pulley 18 so as to rotate the offset cylinder 13 clockwise in FIG. 14. In this case, since the fixed member 11 is incapable of rotating, the tension T1 of the lower span is increased in proportion to drag from the timing belt 19. An increase of the tension T1 acts as rotating force which rotates the tension converting member 12 counterclockwise around the offset axis 03. However, since the rotating force of the tension converting member 12 acts in a direction that the distance t2 between the center of the arc of the tension converting member 12 and the center 01 of the fixed member 11 is gradually increased, the tension converting member 12 cannot rotate unless an extension generates on the belt 14. Thus, the rotating force increases the tension T2 of the upper span. In other words, by the increase of the tension T1, the rotating force to be applied to the tension converting member 12 is converted into the tension T2.

In this way, since the tension T2 is also increased at a set ratio in proportion to the increase of the tension T1, the tension of the belt 14 is increased as a whole, so that application force of the belt 14 to respective friction surfaces 11f, 12d of the fixed member 11 and the tension converting member 12 is increased, thereby generating high grip between the belt 4 and respective friction surfaces 11f, 12d. Thus, great damping force (rotating reaction force) is generated with respect to the force B from the timing belt 19 which acts on the offset cylinder 13, so that the clockwise rotation of the offset cylinder 13 is prevented unless a slip generates between the belt 14 and at least one of the friction surfaces 11f, 12d.

Further, accompanying the generation of the above high grip, a shaft load (an allow C shown in FIG. 14) acts on the offset axis 03 of the tension converting member 12. The shaft load is a resultant of the tension T1, T2 of the upper and lower spans, and generates rotation torque for rotating the offset cylinder 13 counterclockwise. The rotation torque becomes reaction force D acting in the direction opposite to the force B acting on the offset cylinder 13 from the timing belt 19. Accordingly, the reaction force D also generates great damping force (rotating reaction force) with respect to the force B acting on the offset cylinder 13, so that the clockwise rotation of the offset cylinder 13 is prevented unless a slip generates between the belt 14 and at least one of the friction surfaces 11f, 12d of the fixed member 11 and the tension converting member 12.

In the case that great force overcoming the grip between the belt 14 and respective friction surfaces 11f, 12d of the fixed member 11 and the tension converting member 12 acts as the force B from the timing belt 19 on the offset cylinder 13, a slip is generated between the belt 14 and at least one of the friction surfaces 11f, 12d, so that a balance between the force B from the timing belt 19 and its reaction force D is lost. Thus, the offset cylinder 13 commences rotating clockwise. Since the damping force due to the increase of the tension T1, T2 is generated even at the rotation of the offset cylinder 13 due to generation of the slip, a balance between the external force B and the damping force causes a slight amount of slip per unit time, so that the offset cylinder 13 is gradually returned to an initial position. Thus, the timing belt 19 is gradually returned to an initial tension state.

Accordingly, by restricting the rotation of the offset cylinder 13 in the case that the tension of the timing belt 19 is increased, the tension of the timing belt 19 can be controlled while flap of the timing belt 19 is avoided. As a result, according to this embodiment of an auto-tensioner, in such a case that the tension of the timing belt 19 is increased, great damping force is generated in a rotating direction of the offset cylinder 13, thereby obtaining a stable running of the timing belt 19. Thus, a synchronous rotation state can be obtained between the crankshaft and the cam pulley.

As described above, this embodiment of an auto-tensioner for timing belt can be so composed that damping force with respect to the rotation of the offset cylinder 13 in a direction that the slack of the timing belt 19 is absorbed is small and that damping force with respect to rotating force applied to the offset cylinder 13 by increase of tension of the timing belt 19 is large, thereby obtaining high damping characteristics acting in a single direction.

This embodiment of an auto-tensioner also has a simple structure similar to a belt transmission mechanism so composed that a transmission belt is wound between two pulleys. Accordingly, the number of parts is small and assembly work can be readily made. Further, since damping force is changed according to change of tension of respective spans, damping characteristics can be changed by adjusting variations of tension of the spans, thereby readily changing the setting of damping characteristics. Furthermore, since damping force can be generated without using an operating medium readily affected by change of temperature, such as operating oil for a hydraulic auto-tensioner, damping characteristics difficult to be affected by change of temperature can be obtained. Since a slip is generated between the belt and at least one of the fixed member and the tension converting member in order to cope with excessive external force, this acts as a fail-safe function. In addition, a piston rod as in a hydraulic damping mechanism is not required, thereby achieving size reduction. Mounting of this auto-tensioner on the engine is made at a single position, thereby simplifying mounting work.

Modifications

Description will be made next about three types of modifications which are improvements of the above auto-tensioner. Since basic structures of respective modifications are the same as in the above embodiment, description is made about only different parts in respective modifications.

First, description is made about a first type modification. In this modification, for example, a radius of the arc of the friction surface 12d of the tension converting member 12 is smaller than that of the friction surface 11f of the fixed member 11. With this structure, a contact area of the belt 14 with the friction surface 12d of the tension converting member 12 is smaller than a contact area of the belt 14 with the friction surface 11f of the fixed member 11. Thus, this modification is fundamentally so composed that a slip is generated between the friction surface 12d of the tension converting member 12 and the belt 14 at the rotation of the offset cylinder 13.

As a feature of this modification, a belt holding member 31 as a one-way restricting means is mounted at the tension converting member 12, as shown in an imaginary line in FIG. 14. The belt holding member 31 is fixed at an end thereof to the rear side surface of the tension converting member 12. The other end of the belt holding member 31 is bent on the front side, and is positioned opposite to the friction surface 12d of the tension converting member 12 to contact the back of the belt 14 wound over the friction surface 12d of the tension converting surface 12, thereby pressing the belt 14 against the friction surface 12d. The pressing force which presses the belt 14 against the friction surface 12d is set so as to generate a slip between the friction surface 11f of the fixed member 11 and the belt 14 without generating a slip between the friction surface 12d of the tension converting member 12 and the belt 14 at the counterclockwise rotation in FIG. 14 of the offset cylinder 13.

With such a structure, at the operation of the auto-tensioner, when the offset cylinder 13 rotates counterclockwise in FIG. 14, the belt holding member 31 prevents generation of slip between the friction surface 12d of the tension converting member 12 and the belt 14, so that the offset cylinder 13 rotates while a slip is generated between the friction surface 11f of the fixed member 11 and the belt 14. On the contrary, when the offset cylinder 13 rotates clockwise in FIG. 14, the belt 14 is pressed against the friction surface 12d of the tension converting member 12 by increase of the belt tension, so that the application force of the belt 14 to the fixed member 11 and the tension converting member 12 is not substantially affected by the belt holding member 31. In such a contact state of the belt 14, since the radius of the arc of the friction surface 12d of the tension converting member 12 is smaller than that of the friction surface 11f of the fixed member 11, a slip is generated between the friction surface 12d of the tension converting member 12 and the belt 14 without generating a slip between the friction surface 11f of the fixed member 11 and the belt 14. Such an operation successively causes accompanying to-and-fro rotations of the offset cylinder 13. In detail, a slip is generated at the fixed member 11 at the counterclockwise rotation in FIG. 14 of the offset cylinder 13, while a slip is generated at the tension converting member 12 at the clockwise rotation in FIG. 14 of the offset cylinder 13. Thus, the belt 14 is circulated in a direction of an allow E shown in FIG. 14. Accordingly, the contact parts of the belt 14 with the fixed member 11 and the tension converting member 12 are changed, so that it is avoided that only specific parts of the belt 14 contact the fixed member 11 and the tension converting member 12 at any time to degenerate locally, thereby increasing a life of the belt 14.

Instead of the above structure, there may be the case that the radius of the arc of the friction surface 11f of the fixed member 11 is smaller than that of the friction surface 12d of the tension converting member 12 and that the belt holding member 31 is mounted on the fixed member 11. In this case, a slip is generated at the tension converting member 12 at the counterclockwise rotation in FIG. 14 of the offset cylinder 13, while a slip is generated at the fixed member 11 at the clockwise rotation of the offset cylinder 13. Accordingly, even in this case, it is avoided that only specific parts of the belt 14 contact the fixed member 11 and the tension converting member 12 at any time to degenerate locally, thereby increasing a life of the belt 14.

In this modification, by making a difference between the radies of the arcs of the friction surfaces 11f, 12d, a slip is generated at the member 11, 12 to which the belt holding member 31 is fixed when the offset cylinder 13 rotates counterclockwise in FIG. 14. Instead of such a manner, however, by making a difference in friction coefficient between the belt 14 and respective friction surfaces 11f, 12d of the members 11, 12, a slip can be generated at the member 11, 12 to which the belt holding member 31 is fixed.

Figure 19:
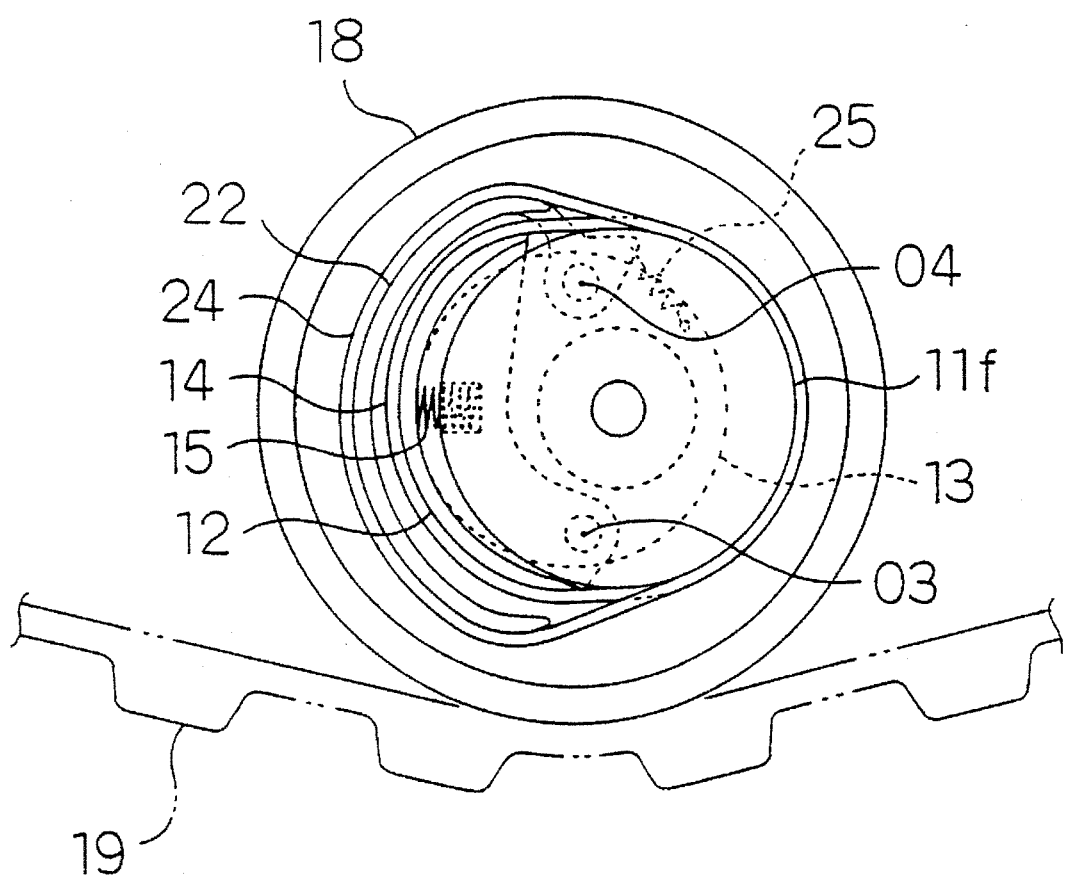
Figure 20:
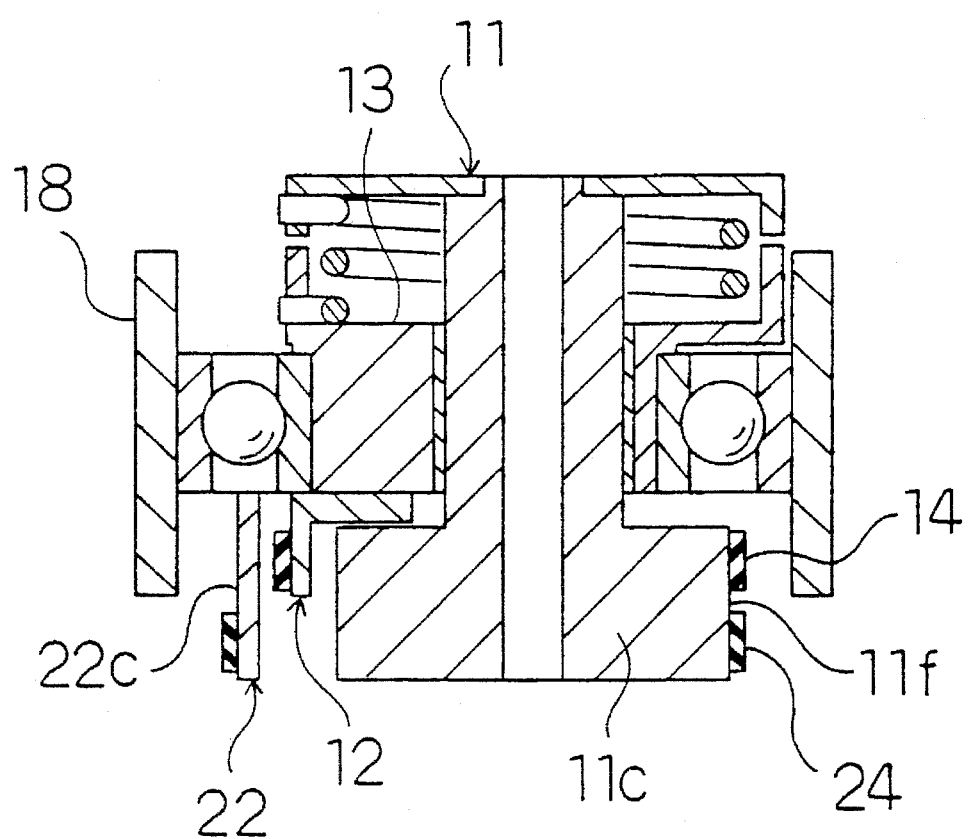
Figure 21:
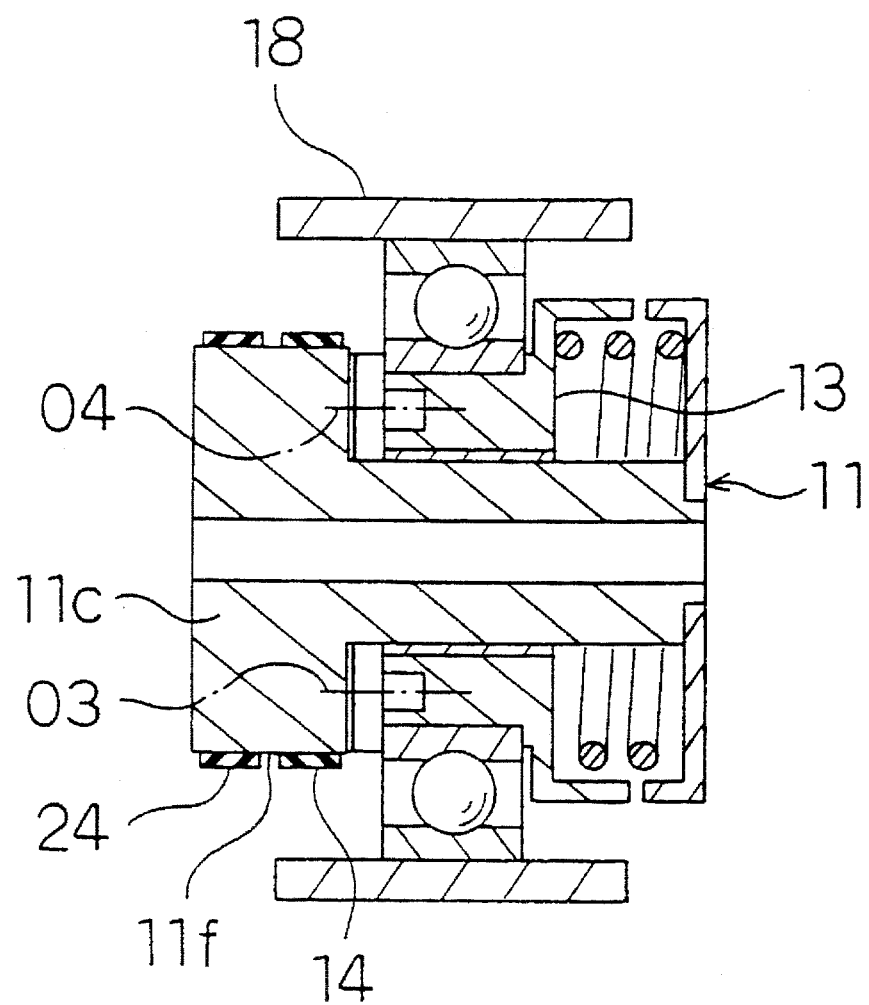

Description is made next about a second type modification. As shown in FIGS. 19 to 21, this modification is so composed that damping force is generated in both the rotating directions of the offset cylinder 13. Specifically, the height of the pulley part 11c of the fixed member 11 is set large, and a second tension converting member 22 having a substantially symmetric with respect to the tension converting member 12 (hereinafter referred to as first tension converting member) is rotatably supported to the end surface of the offset cylinder 13 at a position 04 offset opposite to the offset direction of the rotation axis 03 of the first tension converting member 12. Further, between a base end part of the second tension converting member 22 and the offset cylinder 13, a second initial tension applying spring 25 is spanned as a second forcing member for forcing to rotate the second tension converting member 22 clockwise in FIG. 19. Furthermore, as shown in FIG. 20, a friction member part 22c of the second tension converting member 22 is set larger in height than the friction member part 12c of the first tension converting member 12 to protrude on the front side from the edge of friction member part 12c of the first tension converting member 12.

In addition, a first belt 14 is wound over the first tension converting member 12 and the friction surface 11f of the pulley part 11c, and a second belt 24 is wound over the second tension converting member 22 and the friction surface 11f of the pulley part 11c. In other words, both the belts 14, 24 are arranged in parallel with each other in order that the second belt 24 is located on the front side with respect to the first belt 14.

With the above structure, the same damping action as in the above-mentioned embodiment can be performed by grip of respective belts 14, 24. In detail, when the offset cylinder 13 rotates clockwise in FIG. 19, damping force which restricts the rotation is generated by the first belt 14 and by the first tension converting member 12 and the fixed member 11 between which the first belt 14 is wound. On the contrary, when the offset cylinder 13 rotates counterclockwise in FIG. 19, damping force which restricts the rotation is generated by the second belt 24 and by the second tension converting member 22 and the fixed member 11 between which the second belt 24 is wound.

As a result, according to this modification, damping force can be performed in both the rotating directions, and the amount of damping force in each rotating direction can be arbitrarily set by setting respective offset amounts of the offset rotation axes 03, 04 of respective tension converting members 12, 22, kinds of the belts 14, 24, and respective amounts of force with which respective initial tension applying springs 15, 25 force to rotate. In particular, if damping force with respect to the rotating direction at the decrease of tension of the timing belt 19 is set to a relatively small amount and damping force with respect to the rotating direction at the increase of tension of the timing belt 19 is set to a relatively large amount, the stable running of the timing belt 19 can be obtained at the increase of tension of the timing belt 19, while abrupt variations in contact pressure of the tension pulley 18 to the timing belt 19 at the decrease of tension of the timing belt 19 can be restricted thereby restricting degradation of the timing belt 19.

Description is made next about a third type modification. In this modification, damping characteristics are improved, in particular, by changing the form of the tension converting member 12. Specifically, as shown in an imaginary line in FIG. 14, a weight member 32 is integrally attached to an upper end of the tension converting member 12. In detail, the weight member 32 with relatively large weight is attached to an edge portion in a width direction of the friction surface 12d of the tension converting member 12 in which interference is not made with the belt 14. Between a lower end of the weight member 32 and the friction surface 12d of the tension converting member 12, a clearance (no-shown) is formed for disposing the belt 14. With such a structure, the gravity center of the tension converting member 12 is positioned on an outer peripheral side with respect to a moving locus of the offset rotation center 03 of the tension converting member 12 at the rotation of the offset cylinder 13.

Next, description is made about a damping operation according to the above structure. When the reaction force (an allow B in FIG. 14) from the timing belt 19 acts, in the case that the reaction force B from the timing belt 19 is a static load accompanying no shock, set damping force is obtained by grip between the belt 14 and the fixed member 11 and by grip between the belt 14 and the tension converting member 12 due to increase of the belt tension, as in the above-mentioned embodiment.

On the contrary, in the case that the reaction force B from the timing belt 19 is a load accompanying shock, since the gravity center of the tension converting member 12 is positioned on an outer peripheral side with respect to the moving locus of the offset rotation center of the tension converting member 12 at the rotation of the offset cylinder 13, the tension converting member 12 rotates by its inertial force counterclockwise in FIG. 14 around the offset axis 03. That is, the shaft load is increased. As also mentioned in the above embodiment, the tension T2 of the upper span of FIG. 14 is increased at a set ratio, according to the increase of the tension T1 of the lower span due to the action of the above load. Thus, the factor that increases the shaft load generates at two positions, so that the tension T2 of the upper span is further increased in the case that the load with shock acts, as compared with the case that the static load acts. Accordingly, in the case that the load with shock acts, grip between the belt 14 and the fixed member 11 and grip between the belt 14 and the tension converting member 12 become larger thereby generating larger damping force, as compared with the case that the static load acts.

As described above, with the structure of this modification, in the case that the reaction force from the timing belt 19 is a load with shock, large damping force can be generated with respect to the load, so that dependence of the damping force with respect to the speed of the load can be presented. Accordingly, generation of the situation that the offset cylinder 13 rotates accidentally with respect to the load with shock can be avoided.

In this modification, an endless friction member is used as the friction member. However, a friction member with ends is also applicable.

Third Embodiment

Figure 22:
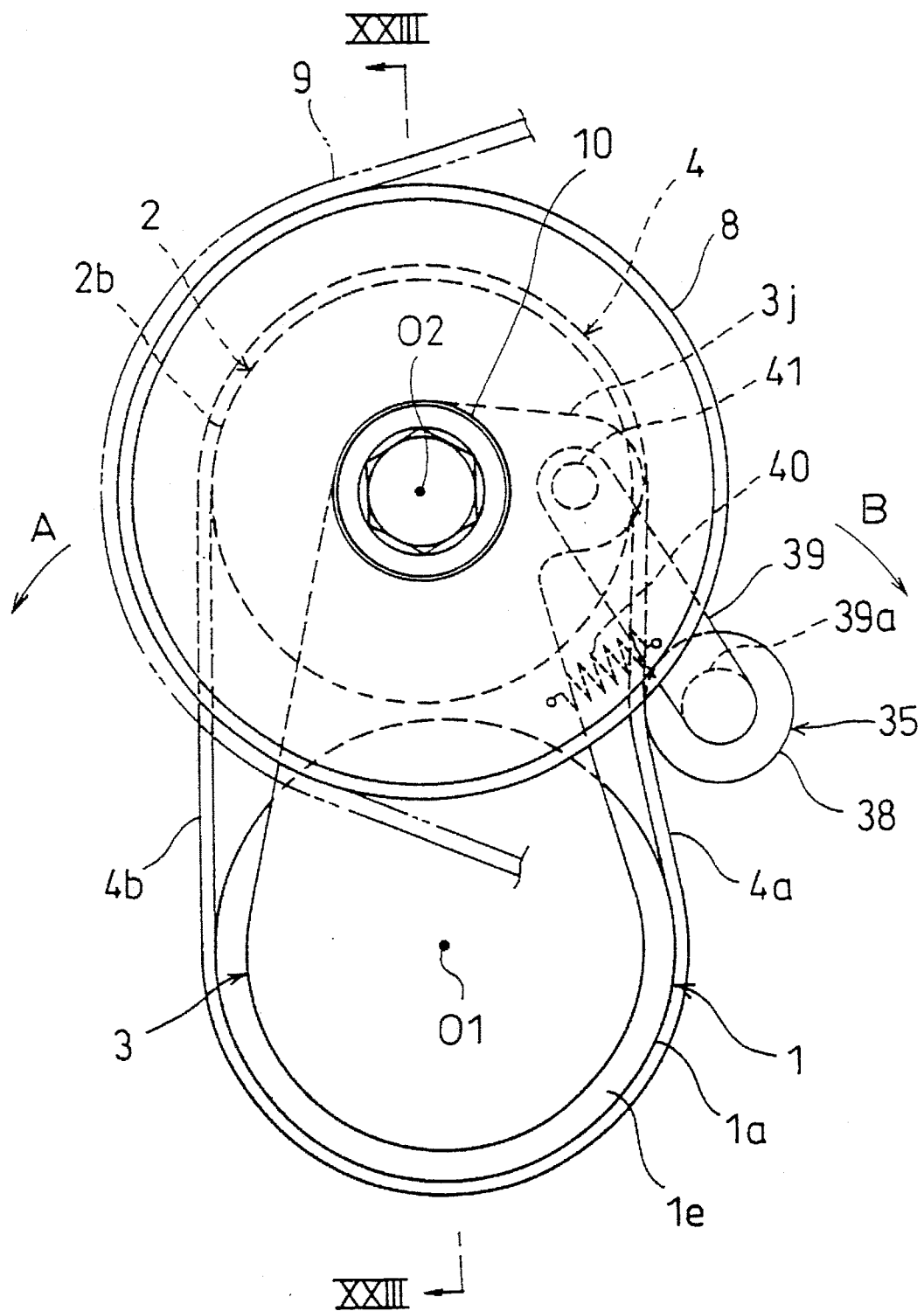
FIGS. 22 to 24 show a third embodiment.
Figure 23:
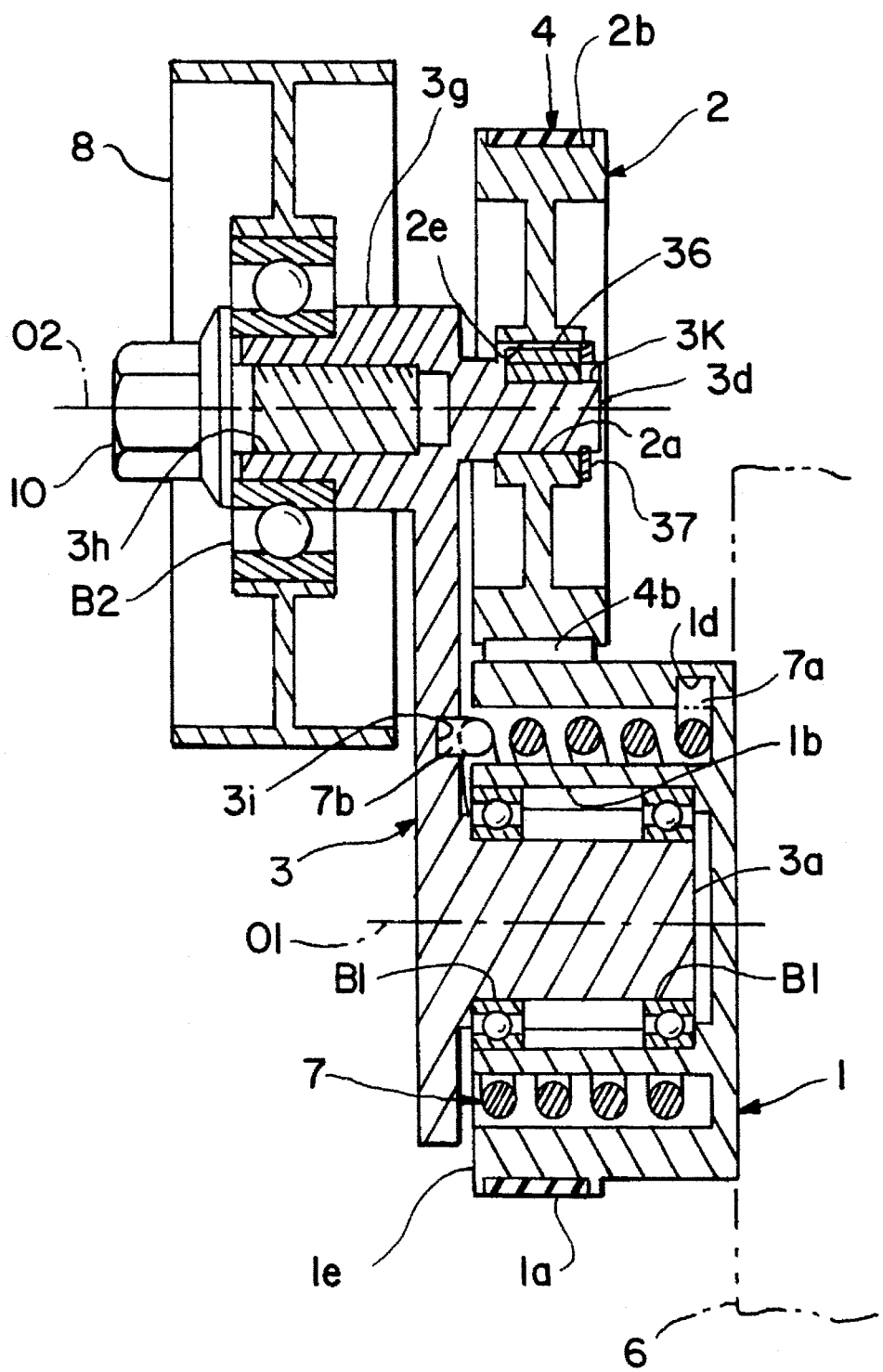
Figure 24:
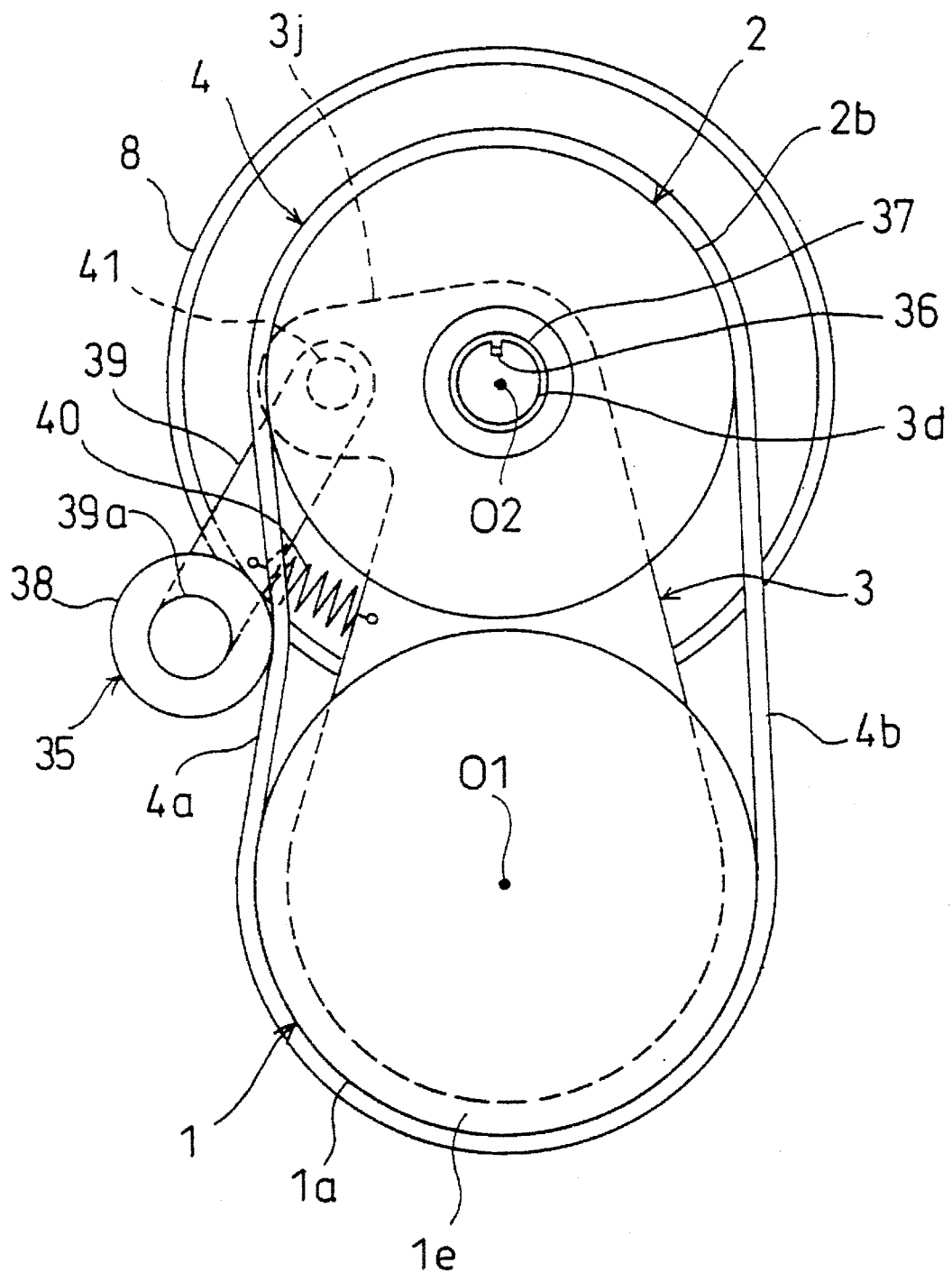

Description will be made next about a third embodiment of an auto-tensioner of this invention, with reference to the drawings. FIGS. 22 to 24 show the whole structure of the third embodiment of an auto-tensioner of this invention. This auto-tensioner is composed so as to apply set tension to a V-belt for driving auxiliaries of a vehicle engine and to automatically change damping force with respect to a tension adjusting operation according to variation of the tension.

As shown in the above figures, this auto-tensioner comprises: a fixed pulley 1 fixed to an engine block 6 of the vehicle engine and having at an outer peripheral surface thereof a circular friction surface 1a; a lever member 3 rotatably supported to the fixed pulley 1 and having a tension pulley 8 rotatable around a central axis 02 parallel with a rotation axis 01 of the fixed pulley 1; a torsion coil spring 7 interposed between the fixed pulley 1 and the lever member 3 to force to rotate the lever member 3 in a set rotating direction A (counterclockwise of FIG. 22) with respect to the fixed pulley 1; a movable pulley 2 unrotatably supported at the same side as the fixed pulley 1 to the lever member 3 and having at an outer peripheral surface thereof a circular friction surface 2b opposed to the friction surface 1a of the fixed pulley 1; a flat belt 4 as an endless friction member wound between the friction surface 1a of the fixed pulley 1 and the friction surface 2b of the movable pulley 2; and a pressing mechanism part 35 as a pressing means for pressing, out of both spans 4a, 4b located between the friction surfaces 1a, 2b of both the pulleys 1, 2 of the flat belt 4, the span 4a located on the side of the opposite direction B (clockwise in FIG. 22) to a rotation forcing direction A in which the torsion coil spring 7 forces to rotate. The pressing mechanism part 35 is so composed that the tension pulley 8 presses the V-belt 9 to apply set tension to the V-belt 9 by the force of the torsion coil spring 7 and that the rotation of the lever member 3 is damped largely when the lever member 3 is rotated in the opposite direction B to the rotation forcing direction A at the variation of belt tension.

The fixed pulley 1 has a flat pulley part 1e which has a cup shape that a front side thereof (left side in FIG. 23) is opened and a cylindrical bearing part 1b extending on the front side along the rotation axis 01 from the center of a bottom part of the flat pulley part 1e. The friction surface 1a is formed by an outer peripheral surface of the pulley part 1e. At an inner surface of a side wall of the pulley part 1e, a spring rear-side end holding hole 1d is recessed outward in a radial direction.

The lever member 3 is formed of a tapered plate which gradually decreases in width from the rotation axis 01 outward in a radial direction. At a large-diameter part located around the rotation axis 01, a columnar shaft part 3a which protrudes toward a rear side (right side in FIG. 23) is provided. The shaft part 3a is rotatably inserted from an end part thereof into the bearing part 1b of the fixed pulley 1 via bearings B1. Further, in the vicinity of the shaft part 3g, a spring front-side end holding hole 3i is recessed toward the front side. At a rotating end of the lever member 3, a first shaft part 3d protruding on the rear side and the a second shaft part 3g are provided on the same central axis 02. At the second shaft part 3g, a bolt hole 3h is formed on its central axis 02. A female thread is formed at the inner surface of the bolt hole 3h. Furthermore, in the vicinity of the shaft parts 3d, 3g, a protruding part 3j protruding rightward in FIG. 22 is provided.

The movable pulley 2 is composed of a flat pulley having the same diameter as the flat pulley part 1e of the fixed pulley 1, forms at an outer peripheral surface thereof the friction surface 2b, and is unrotatably supported to the lever member 3 at the first shaft part 3d. In detail, a fixing hole 2a to be inserted onto the first shaft part 3d from a tip end of the first shaft part 3d is formed at the central axis of the movable pulley 2, and key ways 3k, 2e extending along the central axis of the movable pulley 2 are provided at the outer peripheral surface of the shaft part 3d and the inner peripheral surface of the fixing hole 2a, respectively. The movable pulley 2 is prevented from rotating in such a manner that a key member 36 is fitted into the key ways 2e, 3k. Further, a snap ring 37 is fitted to an end of the outer peripheral surface of the first shaft part 3d, thereby preventing the movable pulley 2 from removing.

The tension pulley 8 is rotatably supported to the second shaft part 3g of the lever member 3 via a bearing B2, and is prevented from removing by a retaining bolt 10 screwed into the bolt hole 3h of the shaft part 3g.

The torsion coil spring 7 is formed at a main portion thereof in a left hand wind, extends at a rear-side end 7a thereof off the main portion outward in a radial direction, and extends at a front-side end 7b thereof off the main portion toward the front side along the rotation axis 01. The rear-side end 7a is inserted into the spring rear-side end holding hole 1d of the fixed pulley 1 and the front-side end 7b is inserted into the spring front-side end holding hole 3i of the lever member 3, so that both the ends 7a, 7b are held in a peripheral direction. Further, the torsion coil spring 7 is contractedly disposed in order that the main portion operates to increase in diameter in the state that both the ends 7a, 7b are held, thereby forcing to rotate the lever member 3 in a set direction A.

The pressing mechanism part 35 is composed of a pressing pulley 38 which can press one span 4a (right span in FIG. 22) of the flat belt 4 from an outer peripheral side of the belt 4, a supporting arm 39 for supporting the pressing pulley 38 and guiding the pressing pulley 38 reciprocatably movably in a pressing direction toward the span 4a, and a tension coil spring 40 for forcing to press the pressing pulley 38 in the pressing direction. The supporting arm 39 is rotatably supported by a pivot pin 41, on the same rotation surface as the lever member 3, to the protruding part 3j of the lever member 3. At a rotating end of the supporting arm 39, a shaft part 39a protruding toward the rear side is provided. The pressing pulley 38 is rotatably supported to the shaft part 39a. Further, the tension coil spring 40 is provided between the supporting arm 39 and the lever member 3.

Thus, according to the above auto-tensioner, one span 4a of the Flat belt 4 is pressed by the pressing mechanism part 35 and the movable pulley 2 is unrotatably supported to the lever member 3. Accordingly, at the rotation of the lever member 3, grip is produced between the flat belt 4 and the friction surface 1a of the fixed pulley 1 and between the flat belt 4 and the friction surface 2b of the movable pulley 2 so that the lever member 3 meets with the resistance to the rotation thereof. That is, damping force acts against the force rotating the lever member 3 and the belt reaction force.

At this time, when the lever member 3 rotates in a rotation forcing direction A by the force of the torsion coil spring 7, i.e., in a direction that the lever member 3 acts so as to change the span 4a pressed by the pressing mechanism part 35 into a tight side span of the belt 4, the span 4b on the opposite side to the span 4a is changed into a slack side span to reduce its tension so that grip between the flat belt 4 and one of the fixed and movable pulleys 1, 2 is decreased. Accordingly, damping force with respect to the force of the torsion coil spring 7 is small so that the tension pulley 8 can be rotated promptly in a direction of pressing the belt 4.

On the contrary, when the lever member 3 rotates by the belt reaction force in the direction B opposite to the rotation forcing direction A, i.e., in a direction that the lever member 3 acts so as to change the span 4a pressed by the pressing mechanism part 35 into a slack side span of the belt 4, the span 4a is pressed by the pressing mechanism part 35, so that the tension of the span 4a is prevented from decreasing. Accordingly, the grip between the flat belt 4 and respective pulleys 1, 2 is maintained, thereby generating large damping force with respect to the belt reaction force. That is, there can be obtained two-way damping characteristics for damping the belt reaction force by large force.

As the rotating force of the lever member 3 is increased due to the belt reaction force, damping force is gradually increased and a ratio of slip generation between the flat pulley 4 and each pulley 1, 2 is also gradually increased. When the rotating force reaches a set value, the ratio of slip generation is abruptly increased to readily reach 100%, so that the damping force with respect to the belt reaction force reaches a substantially fixed value. Thus, the above slip is generated with respect to excessive belt reaction force, thereby performing a fail-safe function for avoiding break of the flat belt 4.

This embodiment of an auto-tensioner has a simple structure similar to a belt transmission mechanism, composed so as to press one of spans of a transmission belt wound between two pulleys by a pressing means. Accordingly, the number of parts is small and assembly work can be readily made. Further, since damping force is changed according to change of tension of respective spans 4a, 4b, damping characteristics can be changed by adjusting variations of tension of the spans 4a, 4b, thereby readily tuning the setting of damping characteristics. Furthermore, since damping force can be generated without using an operating medium readily affected by change of temperature, such as operating oil for a hydraulic auto-tensioner, damping characteristics difficult to be affected by change of temperature can be obtained.

When an auto-tensioner of this embodiment is compared to a hydraulic auto-tensioner, the hydraulic tensioner is so composed that a cylinder is disposed along the running direction of a V-belt 9 and that an operating direction of a piston rod is converted by, for example, 90° with the use of a rotating member for rotatably supporting a tension pulley. On other hand, in an auto-tensioner according to this embodiment, since the lever member 3 can be rotated, the lever member 3 can be disposed along the running direction of the V-belt 9 by integrally forming the lever member 3 with the tension pulley 8. By the integration of the lever member 3 and the tension pulley 8, compaction and weight reduction can be achieved and expense in time and effort at the mounting to the engine block 6 can be reduced in half.

Since the pressing mechanism part 35 is supported to the lever member 3 so as to rotate together with the lever member 3, a relation of positions between the pressing mechanism part 35 and the span 4a to be pressed of the flat belt 4 are uniform. Accordingly, the span 4a can be pressed in the same conditions at any time regardless of rotating positions of the lever member 3, thereby obtaining stable damping characteristics. Further, since the friction surface 1a of the fixed pulley 1 has a circular shape and the flat belt 4 is endless, damping function can be performed at any position around the rotation axis 01 of the lever member 3. Thus, after the mounting to the engine block 6, the tension of the flat belt 4 is slacked so that the lever member 3 can be appropriately set to a set rotation position. Accordingly, the mounting can be executed by only positioning the rotation axis 01, thereby considerably simplifying mounting work.

In the above embodiment, one span 4a of the flat belt 4 is pressed from its outer peripheral side. However, the span 4a may be pressed from the inner peripheral side.

Further, in the above embodiment, only one span 4a is pressed at all times. However, both the spans 4a, 4b may be pressed alternately according to the rotating direction of the lever member 3.

Furthermore, in the above embodiment, a flat belt 4 is used as a friction member. However, a V-belt or a V-ribbed belt may be applicable. In such a case, if the friction surface is formed along the cross-sectional profile of the belt used, large grip can be obtained.

On the contrary, a steel belt may be used as a friction member so as to readily generate a slip.

Moreover, in the above embodiment, respective friction surfaces 1a, 2b of the fixed and movable pulleys 1, 2 are formed in a circular shape. However, the friction surfaces 1a, 2b may be formed in an arcuate shape to the extent that required grip with respect to the friction member is obtained.

In the above embodiment, a slip between the friction member and each pulley is utilized as a fail-safe function. However, since damping force can be obtained even in the state that a slip generates, a normal range of damping force may be set so as to include a level on which respective slip ratios in both the rotating directions of the lever member 3 reach 100%. In such a case, at a pulley in which a slip generates even if the lever member 3 rotates in either direction, a restricting means for clamping the flat belt in association with the friction surface of the pulley may be provided. Thereby, a slip of the flat belt 4 is permitted at the rotation of the lever member 3 in the direction B opposite to the rotation forcing direction A, while a slip is restricted at the rotation of the lever member 3 in a direction that damping force is small, so that the flat belt 4 can be circulated in a single direction accompanying the rotations in both directions of the lever member 3. Accordingly, it can be prevented that grip with respect to the fixed pulley 1 and grip with respect to the movable pulley 2 are locally applied to specific parts of the flat belt 4. As a result, a load to the flat belt 4 is spread evenly to the whole flat belt 4.

Further, in the above embodiment, an endless friction member is used. However, a friction member with ends is also applicable. In this case, instead of the fixed pulley 1, a fixed plate to which both ends of the friction member are fixedly attachable is used.

Fourth Embodiment

Figure 25:
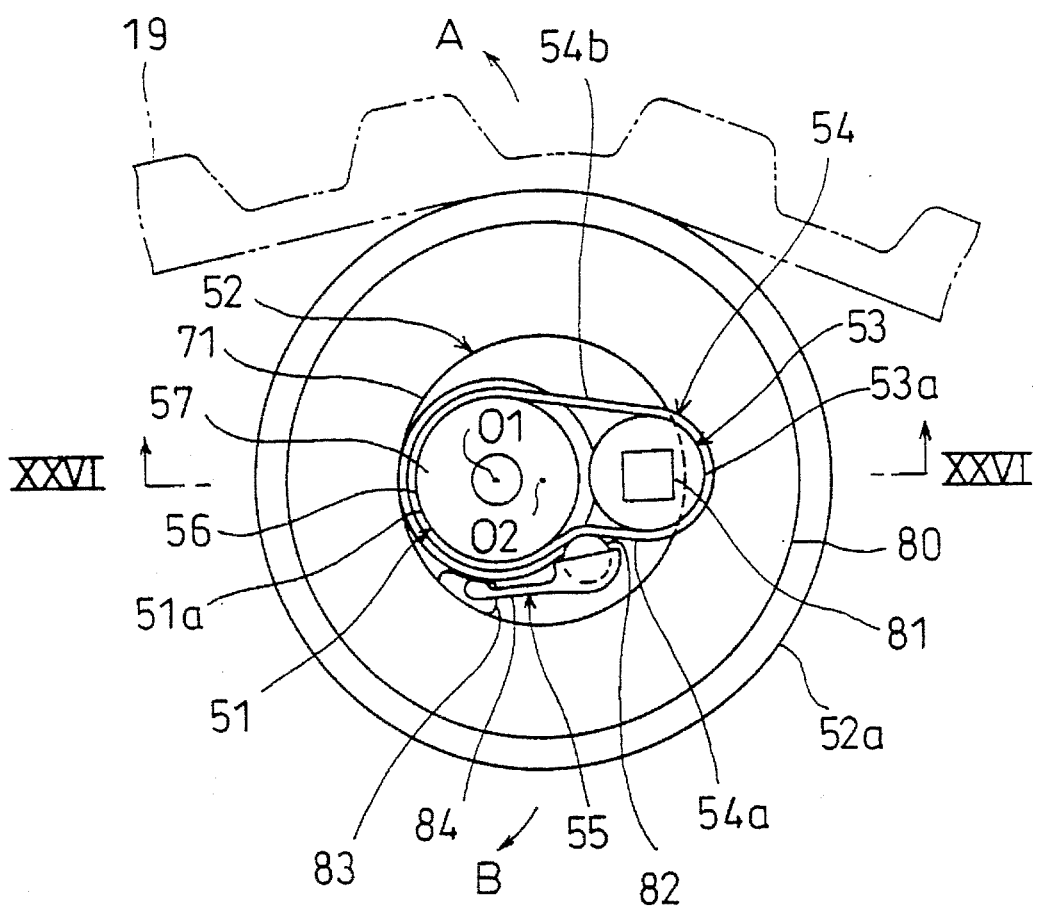
FIGS. 25 to 27 show a fourth embodiment.
Figure 26:
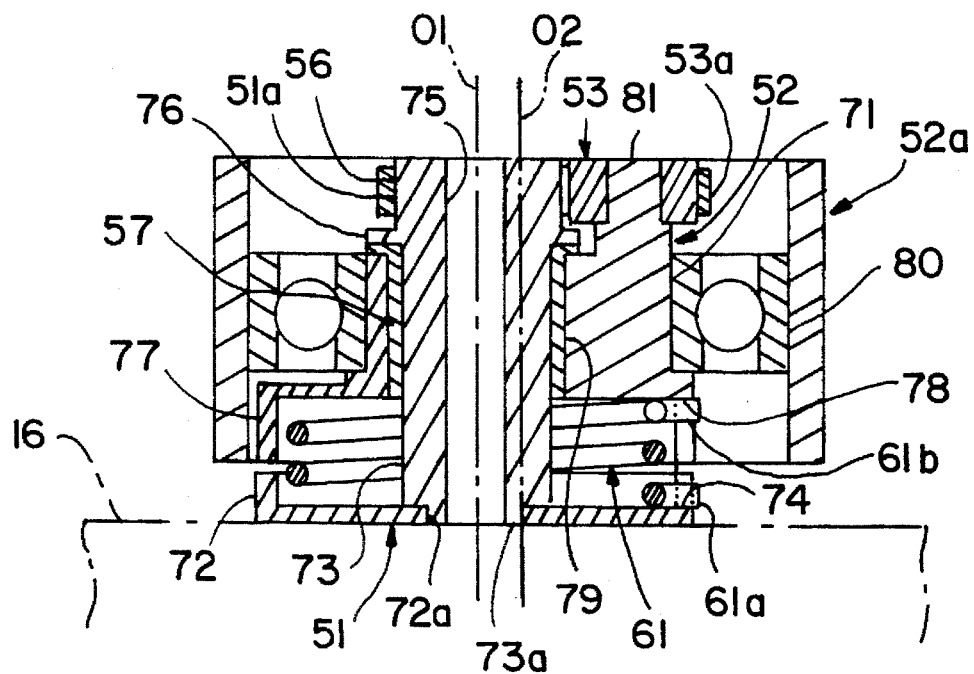

Description will be made next about a fourth embodiment of an auto-tensioner of this invention, with reference to the drawings. FIGS. 25 to 26 show the whole structure of the fourth embodiment of an auto-tensioner of this invention. This auto-tensioner is composed so as to apply set tension to a timing belt 19 for driving a cam shaft of an OHC engine (overhead cam shaft engine) for vehicle and to automatically change damping force with respect to a tension adjusting operation according to reaction force of the timing belt 19.

As shown in the above figures, this auto-tensioner comprises: a fixed pulley 51 fixed to an engine block 16 of the vehicle engine and having a shaft part 57 and a circular friction surface 51a provided at an outer peripheral surface; a rotating member 52 having a cylindrical part 71 rotatably fitted onto the shaft part 57 of the fixed pulley 1 and having a tension pulley 52a which is located outside of the cylindrical part 71 and is rotatable around a central axis 02 parallel with a rotation axis 01 of the cylindrical part 71; a torsion coil spring 61 as a forcing means interposed between the fixed pulley 51 and the rotating member 52 to force to rotate the rotating member 52 in a set rotating direction A (counterclockwise in FIG. 25) with respect to the fixed pulley 51; a movable pulley 53 unrotatably supported to the rotating member 52 and having at an outer peripheral surface thereof a circular friction surface 53a opposed to the friction surface 51a of the fixed pulley 51; a flat belt 54 as an endless friction member wound between the friction surface 51a of the fixed pulley 51 and the friction surface 53a of the movable pulley 53; and a pressing mechanism part 55 as a pressing means for pressing, out of both spans 54a, 54b located between the friction surfaces 51a, 53a of both the pulleys 51, 53 of the flat belt 54, the span 54a located on the side of the direction B opposite to the rotation forcing direction A that the torsion coil spring 61 forces to rotate. The pressing mechanism part 55 is so composed that the tension pulley 52a presses the timing belt 19 to apply set tension to the timing belt 19 by the force of the torsion coil spring 61 and that the rotation of the rotating member 52 is damped largely when the rotating member 52 is rotated in the direction B opposite to the rotation forcing direction A at the change of belt tension.

The fixed pulley 51 has a rear case part 72 which has a cylindrical cup shape that a front side thereof (upper side in FIG. 26) is opened and a column part 73 extending on the front side along the rotation axis 01 from the center of a bottom part of the rear case part 72. The rear case part 72 and the column part 73 are integrally assembled in such a manner that a small-diameter part 73a provided at a rear side end of the column part 73 is inserted into and fixed to a fixing hole 72a formed at the center of the bottom part of the rear case part 72. At a part of a side wall of the rear case part 72, a rear-side holding slit 74 is formed so as to extend along the rotation axis 01 to reach an opening end of the rear case part 72. At the column part 73, a bolt hole 75 is formed along the rotation axis 01. Further, a front-side end of the column part 73 is a large-diameter part which is slightly larger in diameter. The large-diameter part forms a pulley part 56 of the fixed pulley 51. Furthermore, at a peripheral edge on a rear side (lower side in FIG. 26) of the pulley part 56, a flange part 76 protruding outward in a radial direction is provided over a circumference of the pulley part 56. The shaft part 57 is formed by a part extending from the flange part 76 to the rear side of the column part 73.

The rotating member 52 has a front case part 77 which has a cylindrical cup shape that the rear side is opened. The front case part 77 is opposed to an opening of the rear case part 72, and is integrally provided at a rear-side opening end of the cylindrical part 71. At a part of a side wall of the front case part 77, a front-side holding slit 78 is formed so as to extend along the rotation axis 01 to an opening end of the front case part 77. Further, the cylindrical part 71 is supported to the shaft part 57 of the fixed pulley 51 rotatably around the rotation axis 01 via a resin bush 79. At an outer peripheral side of the cylindrical part 71, the tension pulley 52a is rotatably supported around the axis 02 via a bearing 80. Furthermore, at an end on the front side of the rotating member 52, a shaft part 81 of rectangular cross section is provided so as to extend toward the front side along the rotation axis 01.

The movable pulley 53 is fitted at a rectangular cross-section fixing hole provided along its axis onto the shaft part 81 of the rotating member 52, so as to be unrotatably supported to the rotating member 52. The movable pulley 53 is formed of a flat pulley smaller in diameter than the pulley part 56 of the fixed pulley 51, and is disposed on an inner peripheral side of the tension pulley 52a. At an inner peripheral side of the tension pulley 52a, the flat belt 54 of short length is wound between the friction surface 51a of the pulley 51 and the friction surface 53a of the movable pulley 53.

Figure 27:
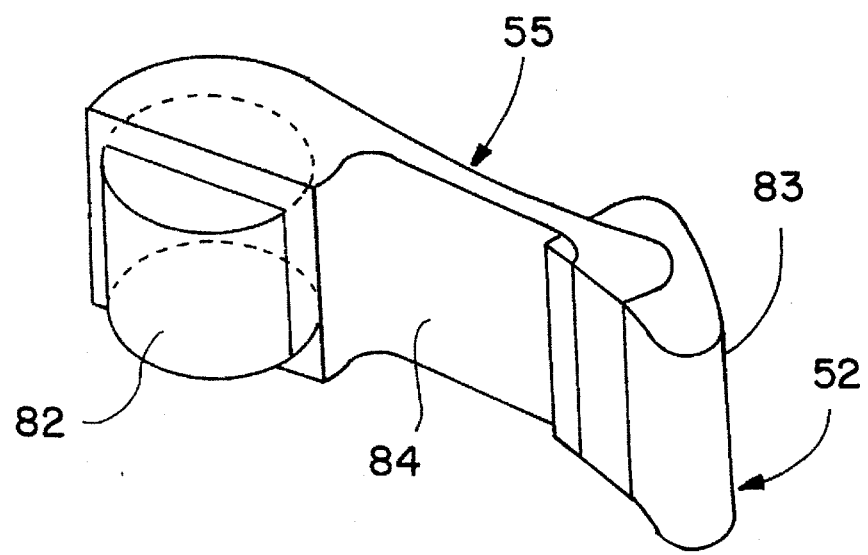
Figure 27:
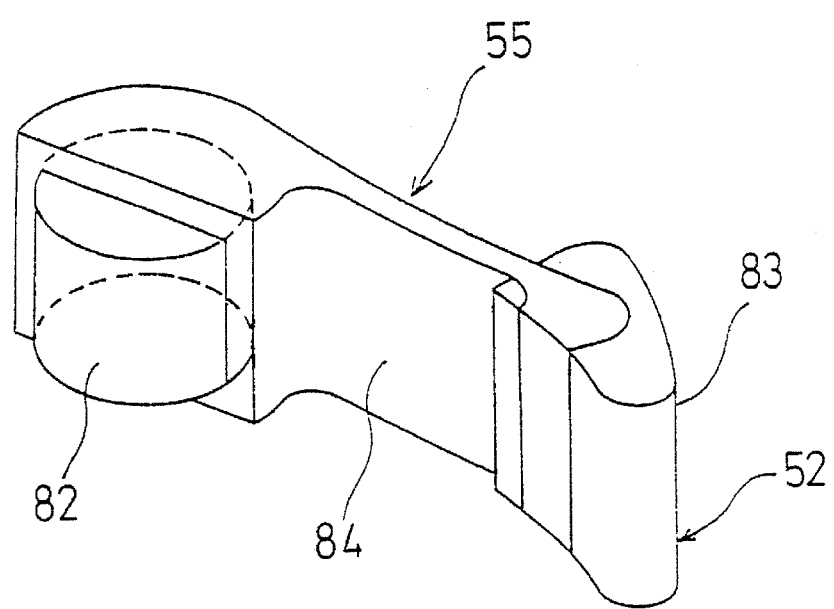

On a front-side end surface of the cylindrical part 71 of the rotating member 52, the pressing mechanism part 55 is provided for pressing one span 54a (lower span in FIG. 25) of the flat belt 54. As shown in detail in FIG. 27, the pressing mechanism part 55 is composed of: a metallic column part 82 which can press the span 54a of the flat belt 54 from an outer peripheral side of the belt 54; and a resin spring 84 in which the column part 82 is embedded at a tip end thereof and which is supported at a base end thereof to a holding part 83 of the rotating member 52.

At a space between the rear case part 72 of the fixed pulley 51 and the front case part 77 of the rotating member 52, the torsion coil spring 61 is contractedly interposed. The torsion coil spring 61 is formed at a main portion thereof in a left hand wind. A rear-side end 61a and a front-side end 61b pass through the holding slits 74, 78 in a radial direction respectively so as to be held by them. Thus, the torsion coil spring 61 forces to rotate the tension pulley 52a in the set direction A to press the timing belt 19.

Thus, according to the above auto-tensioner, one span 54a of the flat belt 54 is pressed by the pressing mechanism part 55 and the movable pulley 53 is unrotatably supported to the rotating member 52. Accordingly, at the rotation of the rotating member 52, grip is produced between the flat belt 54 and the friction surface 51a of the fixed pulley 51 and between the flat belt 54 and the friction surface 53a of the movable pulley 53 so that the rotating member 52 meets with the resistance to the rotation thereof. That is, damping force acts against the force rotating the rotating member 52 and the belt reaction force.

At this time, when the rotating member 52 rotates in the rotation forcing direction A by the force of the torsion coil spring 61, i.e., in a direction that the rotating member 52 acts so as to change the span 54a pressed by the pressing mechanism part 55 into a tight side span of the belt 54, the span 54b on the opposite side to the span 54a is changed into a slack side span to reduce its tension so that grip between the flat belt 54 and one of the fixed and movable pulleys 51, 53 is decreased. Accordingly, damping force with respect to the force of the torsion coil spring 61 is small so that the tension pulley 52a can be rotated promptly in a direction of pressing the belt; 54.

On the contrary, when the rotating member 52 rotates by the belt reaction force in the direction B opposite to the rotation forcing direction A, i.e., in a direction that the rotating member 52 acts so as to change the span 54a pressed by the pressing mechanism part 55 into a slack side span of the belt 54, the span 54a is pressed by the pressing mechanism part 55, so that the tension of the span 54a is prevented from decreasing. Accordingly, the grip between the flat belt 54 and respective pulleys 51, 53 is maintained, thereby generating large damping force with respect to the belt reaction force. That is, there can be obtained two-way damping characteristics for damping the belt reaction force by large force.

As the rotating force of the rotating member 52 is increased due to the belt reaction force, damping force is gradually increased and a ratio of slip generation between the flat pulley 54 and each pulley 51, 53 is also gradually increased. When the rotating force reaches a set value, the ratio of slip generation is abruptly increased to readily reach 100%, so that the damping force with respect to the belt reaction force reaches a substantially fixed value. Thus, the above slip is generated with respect to excessive belt reaction force, thereby performing a fail-safe function for avoiding break of the flat belt 54.

This embodiment of an auto-tensioner has a simple structure similar to a belt transmission mechanism, composed so as to press one of spans of a transmission belt wound between two pulleys by a pressing means. Accordingly, the number of parts is small and assembly work can be readily made. Further, since damping force is changed according to change of tension of respective spans 54a, 54b, damping characteristics can be changed by adjusting variations of tension of the spans 54a, 54b, thereby readily tuning the setting of damping characteristics. Furthermore, since damping force can be generated without using an operating medium readily affected by change of temperature, such as operating oil for a hydraulic auto-tensioner, damping characteristics difficult to be affected by change of temperature can be obtained.

When an auto-tensioner of this embodiment is compared to a hydraulic auto-tensioner, the hydraulic tensioner is so composed that a cylinder is disposed along the running direction of a V-belt and that an operating direction of a piston rod is converted by, for example, 90° with the use of a rotating member for rotatably supporting a tension pulley. On the other hand, in an auto-tensioner according to this embodiment, since the rotating member 52 can be rotated, the rotating member 52 can be disposed along the running direction of the timing belt 19 by integrally forming the rotating member 52 with the tension pulley 52a. By the integration of the rotating member 52 and the tension pulley 52a, compaction and weight reduction can be achieved and expense in time and effort at the mounting to the engine block 16 can be reduced in half.

Since the pressing mechanism part 55 is supported to the rotating member 52 so as to rotate together with the rotating member 52, a relation of positions between the pressing mechanism part 55 and the span 54a to be pressed of the flat belt 54 are uniform. Accordingly, the span 54a can be pressed in the same conditions at any time regardless of rotating positions of the rotating member 52, thereby obtaining stable damping characteristics. Further, since the friction surface 51a of the fixed pulley 51 has a circular shape and the flat belt 54 is endless, damping function can be performed at any position around the rotation axis 01 of the rotating member 52. Thus, after the mounting to the engine block 16, the tension of the flat belt 54 is slacked so that the rotating member 52 can be appropriately set to a set rotation position. Accordingly, the mounting can be executed by only positioning the rotation axis 01, thereby considerably simplifying mounting work.

Further, since the shaft part 57 at which the fixed pulley 51 rotatably supports the rotating member 52, the movable pulley 53 and the flat belt 54 are provided on an inner peripheral side of the tension pulley 52a, the auto-tensioner can be compacted as a whole. Accordingly, the dimension in a direction of the rotation axis 01 is reduced, so that the whole length of the vehicle engine including the auto-tensioner is decreased. This considerably advantages when the auto-tensioner is disposed in an engine room for vehicle which is filled with various kinds of devices, piping and wires without spaces.

In the above embodiment, one span 54a of the flat belt 54 is pressed from its outer peripheral side. However, the span 54a may be pressed from the inner peripheral side.

Further, in the above embodiment, only one span 54a is pressed at all times. However, both the spans 54a, 54b may be pressed alternately according to the rotating direction of the rotating member 52.

Furthermore, in the above embodiment, a flat belt 54 is used as a friction member. However, a V-belt or a V-ribbed belt may be applicable. In such a case, if the friction surface is formed along the cross-sectional profile of the belt used, large grip can be obtained.

On the contrary, a steel belt may be used as a friction member so as to readily generate a slip.

Moreover, in the above embodiment, respective friction surfaces 51a, 53a of the fixed and movable pulleys 51, 53 are formed in a circular shape. However, the friction surfaces 51a, 53a may be formed in an arcuate shape to the extent that required grip with respect to the friction member is obtained.

In the above embodiment, a slip between the friction member and each pulley is utilized as a fail-safe function. However, since damping force can be obtained even in the state that a slip generates, a normal range of damping force may be set so as to include a level on which respective slip ratios in both the rotating directions of the rotating member 52 reach 100%. In such a case, at a pulley in which a slip generates even if the rotating member 52 rotates in either direction, a restricting means for clamping the flat belt in association with the friction surface of the pulley may be provided. Thereby, a slip of the flat belt 54 is permitted at the rotation of the rotating member 52 in the direction B opposite to the rotation forcing direction A, while a slip is restricted at the rotation of the rotating member 52 in a direction that damping force is small, so that the flat belt 54 can be circulated in a single direction accompanying the rotations in both directions of the rotating member 52. Accordingly, it can be prevented that grip with respect to the fixed pulley 51 and grip with respect to the movable pulley 53 are locally applied to specific parts of the flat belt 54. As a result, a load to the flat belt 54 is spread evenly to the whole flat belt 54.

Further, in the above embodiment, an endless friction member is used. However, a friction member with ends is also applicable. In this case, instead of the fixed pulley 51, a fixed plate to which both ends of the friction member are fixedly attachable is used.

We claim:

1. An auto-tensioner comprising:

a tension pulley for pressing a transmission belt;

a pulley member connected to the tension pulley;

a friction member wound over the pulley member; and damping means, when the pulley member is moved by reaction force acting on the tension pulley from the transmission belt, for generating damping force in accordance with the reaction force by grip generated between the friction member and the pulley member owing to change of tension between both spans of the friction member; wherein said damping means includes:

a fixed member which is fixed to a fixed side and which has a substantially arcuate friction surface and a shaft part provided on the same axis as the center of the arc of the friction surface;

an offset cylinder which has an opening for inserting the shaft part at a position offset from the center thereof and which is supported to the fixed member rotatably around a rotation axis offset from the center of the arc of the friction surface;

a tension pulley rotatably supported to an outer peripheral side of the offset cylinder;

a resilient member for forcing to rotate the offset cylinder in a set direction with respect to the fixed member;

a tension converting member which is supported to an end surface of the offset cylinder, is rotatable around a rotation axis offset from the rotation axis of the offset cylinder and has at an outer periphery thereof a substantially arcuate friction surface opposed to the friction surface of the fixed member;

a friction member wound between the friction surface of the fixed member and the friction surface of the tension converting member; and a forcing member for forcing to rotate the tension converting member outward around the offset rotation axis of the tension converting member so as to apply set tension to the friction member, and the offset rotation axis of the tension converting member is offset in the same direction as a forcing direction of the resilient member with respect to a line connecting between centers of arcs of the friction surfaces of both the fixed member and the tension converting member.

2. An auto-tensioner according to claim 1, further comprising one-way restricting means which is provided at the member at which a slip generates with respect go the friction member when the offset cylinder is rotated opposite to an offset direction of the offset rotation axis of the tension converting member by external force acting on the tension pulley, restricts generation of a slip of the friction member when the offset cylinder is rotated in the offset direction of the offset rotation axis of the tension converting member by the force of the resilient member acting on the offset cylinder, and permits generation of a slip of the friction member when the offset cylinder is rotated opposite to the offset direction of the offset rotation axis of the tension converting member by external force acting on the tension pulley.

3. An auto-tensioner according to claim 2, wherein the friction surfaces of the offset cylinder and the tension converting member are different in curvature radius from each other and so composed that a slip generates between the friction member arid one of the friction surfaces which is smaller in curvature radius when the offset cylinder is rotated opposite to the offset direction of the offset rotation axis of the tension converting member by external force acting on the tension pulley, and the one-way restricting means is composed so as to press the friction member against the member the friction surface of which is smaller in curvature radius out of the offset cylinder and the tension converting member.

4. An auto-tensioner according to claim 2, wherein the friction surfaces of the offset cylinder and the tension converting member are different from each other in friction coefficient with respect to the friction member and so composed that a slip generates between the friction member and one of the friction surfaces which is smaller in friction coefficient when the offset cylinder is rotated opposite to the offset direction of the offset rotation axis of the tension converting member by external force acting on the tension pulley, and the one-way restricting means is composed so as to press the friction member against the member the friction surface of which is smaller in friction coefficient out of the offset cylinder and the tension converting member.

5. An auto-tensioner according to any one of claim 1 wherein the gravity center of the tension converting member is positioned on the opposite side to the rotation axis of the offset cylinder with respect to a moving locus of the offset rotating center of the tension converting member at the rotation of the offset cylinder.

6. An auto-tensioner according to claim 1, wherein the friction member is an endless belt.

7. An auto-tensioner according to any one of claim 1, wherein the transmission belt is for driving an auxiliary of a vehicle engine.

8. An auto-tensioner according to any one of claim 1, wherein the transmission belt is for driving a cam shaft of a vehicle engine.

9. An auto-tensioner, comprising:

a fixed member mounted on a fixed side and having an outer periphery that includes a substantially arcuate friction surface;

a rotating member rotatably supported on the fixed member;

a tension pulley rotatably supported on the rotating member;

a resilient member for biasing the rotating member in an angular direction with respect to the fixed member so as to push the tension pulley against a transmission belt;

a movable member supported on the rotating member and having at an outer periphery thereof a substantially arcuate friction surface in opposition to the friction surface of the fixed member;

a friction member wound around the friction surface of the fixed member and the friction surface of the movable member, said friction member having two opposing spans of under tension;

wherein the tensions of both spans of the friction member is changed by the reaction force acting on the tension pulley from the power transmission belt, and a damping force in accordance with the reaction force is generated by a grip force generated between the friction member and each of said friction surfaces by a change of the tension between both the spans of the friction member.

* * * * *